United States Patent [19]

Czekai et al.

[11] Patent Number: 5,478,705
[45] Date of Patent: Dec. 26, 1995

[54] MILLING A COMPOUND USEFUL IN IMAGING ELEMENTS USING POLYMERIC MILLING MEDIA

[75] Inventors: David A. Czekai, Honeoye Falls; Dennis E. Smith; John F. Bishop, both of Rochester; Paul E. Woodgate, Spencerport; James R. Bennett, Rochester, all of N.Y.

[73] Assignee: Eastman Kodak Company, Rochester, N.Y.

[21] Appl. No.: 248,925

[22] Filed: May 25, 1994

[51] Int. Cl.$^6$ .................................................. B02C 17/20
[52] U.S. Cl. .................. 430/449; 430/546; 430/377; 430/349; 430/631; 241/184
[58] Field of Search .................................. 430/546, 377, 430/449, 631; 241/184

[56] References Cited

U.S. PATENT DOCUMENTS

| | | | |
|---|---|---|---|
| 3,104,608 | 9/1963 | Castelll et al. | 241/16 |
| 3,713,593 | 1/1973 | Morris et al. | 241/184 |
| 4,262,851 | 4/1981 | Graser et al. | 241/184 |
| 4,404,346 | 9/1983 | Pirotta et al. | 521/29 |
| 4,474,872 | 10/1984 | Onishi et al. | 430/546 |
| 4,940,654 | 7/1990 | Diehl et al. | 430/522 |
| 4,974,368 | 12/1990 | Miyamoto et al. | 51/55 |
| 5,066,335 | 11/1991 | Lane et al. | 134/7 |
| 5,066,486 | 11/1991 | Kamen et al. | 424/63 |
| 5,145,684 | 9/1992 | Liversidge et al. | 429/489 |

FOREIGN PATENT DOCUMENTS 498482  8/1992  European Pat. Off. .

OTHER PUBLICATIONS

Drukenbrod, "Smaller Is Better?", Paint & Coatings Industry, Dec. 1991, p. 18.

*Primary Examiner*—Charles L. Bowers, Jr.
*Assistant Examiner*—Mark F. Huff
*Attorney, Agent, or Firm*—Andrew J. Anderson

[57] ABSTRACT

Particles of compound useful in imaging elements are milled using a milling media comprising a polymeric resin. The use of polymeric milling media permits the production of particles having an average particle size less than 1 micron. Further, the resulting particles are free from the contamination resulting from conventional milling media of, for example, glass, ceramic or steel.

13 Claims, 8 Drawing Sheets

MILLING A COMPOUND USEFUL IN IMAGING ELEMENTS USING POLYMERIC MILLING MEDIA

FIELD OF THE INVENTION

This invention relates to a process for producing fine particles of a compound useful in imaging elements and to dispersions of such compounds.

BACKGROUND OF THE INVENTION

Comminution (size reduction by mechanical means) of crystalline solids using wet milling techniques such as ball milling or media milling processes is a common technique used in the paint and pigment industry and has recently been exploited for producing small (<1 μm) size particle dispersions of photographic materials, for example, see U.S. Pat. No. 4,940,654 to Diehl et al. In such milling applications, milling media are generally selected from a variety of dense materials, such as steel, ceramic or glass. In ball milling processes, both milling efficiency and attrition-related contamination are generally thought to be proportional to media density. Higher viscosity dispersions often require very dense media, such as stainless steel. Media geometries may vary depending on the application, although spherical or cylindrical beads are most commonly used.

Dispersions prepared by these techniques are typically stabilized using a surface agent to prevent agglomeration. In general, it is desirable to obtain the smallest possible particle size while minimizing attrition-related contamination from milling equipment and milling media. Such goals are often contradictory, i.e., the increased energy required to achieve a small particle size often results in excessive levels of metallic, ceramic or other types of contamination. High intensity milling is also desirable to maximize milling efficiencies, (i.e., rate of size reduction).

Attrition-related contamination in compounds useful in imaging elements dispersions (filter dyes, sensitizing dyes, couplers, antifoggants, etc.) can result in both physical and sensitometric defects. Contamination resulting from the milling process is usually present in the form of dissolved species or particulates of comparable sizes to dispersed product particles. Given this, separation of the contaminant particles from the product particles by filtration is generally ineffective. It is considered preferable to adjust formulation and process parameters and materials to minimize the generation of contaminants.

Attrition from the milling process can also result in chemical alteration of the product dispersion. Many types of ceramic and glass milling media contain metal oxides which release hydroxide ions into the dispersion and increase product pH. Such pH changes are undesirable since this can affect dispersion stability and change milling performance.

A further disadvantage of attrition is the excessive wear of milling media and mill components which can degrade milling performance and increase manufacturing maintenance costs. Most types of conventional media also require preconditioning to achieve a steady rate of wear.

Problem to be Solved by the Invention

This invention is directed to a solution to the aforementioned problems with preparing fine particle dispersions of photographically useful compound.

Summary of the Invention

We have found that polymeric milling media is a viable alternative to conventional ceramic, steel or glass media for the preparation of compounds useful in imaging elements dispersions using conventional media mill processes. The milling performance with polymeric media is comparable to performance with conventional media, despite the much lower media density of the polymeric media. The levels of heavy metal contamination were found to be unexpectedly low in dispersions prepared with polymeric media. Photographic coating melts prepared from these dispersions were found to contain a reduced number of large particulates normally associated with physical coating defects in photographic film.

One aspect of this invention comprises a process for the preparation of a solid particles of a compound useful in imaging elements which comprises milling said compound in the presence of milling media comprising a polymeric resin.

Another aspect of this invention comprises a photographic dispersion comprising an aqueous medium having dispersed therein solid particles of a compound useful in imaging elements having a particle size of less than about 1 micron wherein the particles have been prepared by milling said particles in the presence of a milling media comprising a polymeric resin.

Advantageous Effect of the Invention

1. Polymeric milling media is suitable replacement for conventional ceramic, glass or steel media and has comparable milling performance to conventional media.
2. Given the absence of metal oxides and soluble salts, polymeric media is preferable to conventional media since pH fluctuations and chemical changes are minimized during milling. Such changes may impair dispersion stability, hydrolyze certain solids and alter milling performance.
3. Polymeric media results in much lower heavy metal contamination.
4. The reduced density of polymeric media reduces power draw on the mill and may reduce operating energy costs.
5. Reduced contamination with polymeric media can reduce sensitometric and physical defects in film coatings which are related to soluble or particle contaminants.
6. Reduced contamination with polymeric media improves both milling media and milling components life.
7. Polymeric media are less sensitive to process conditions and may provide improved scalability from pilot to production scale processes.
8. Polymeric media may be less expensive than some types of ceramic media formulated for wear resistance (e.g., yttria-stabilized zirconium oxide media).
9. The reduced density of polymeric media improves the ease of physical handling of the media and simplifies manufacturing operations requiring heavy lifting by operators.
10. Contaminants from the polymeric media are likely to be innocuous in photographic coatings.

DETAILED DESCRIPTION OF THE INVENTION

Figure 1:
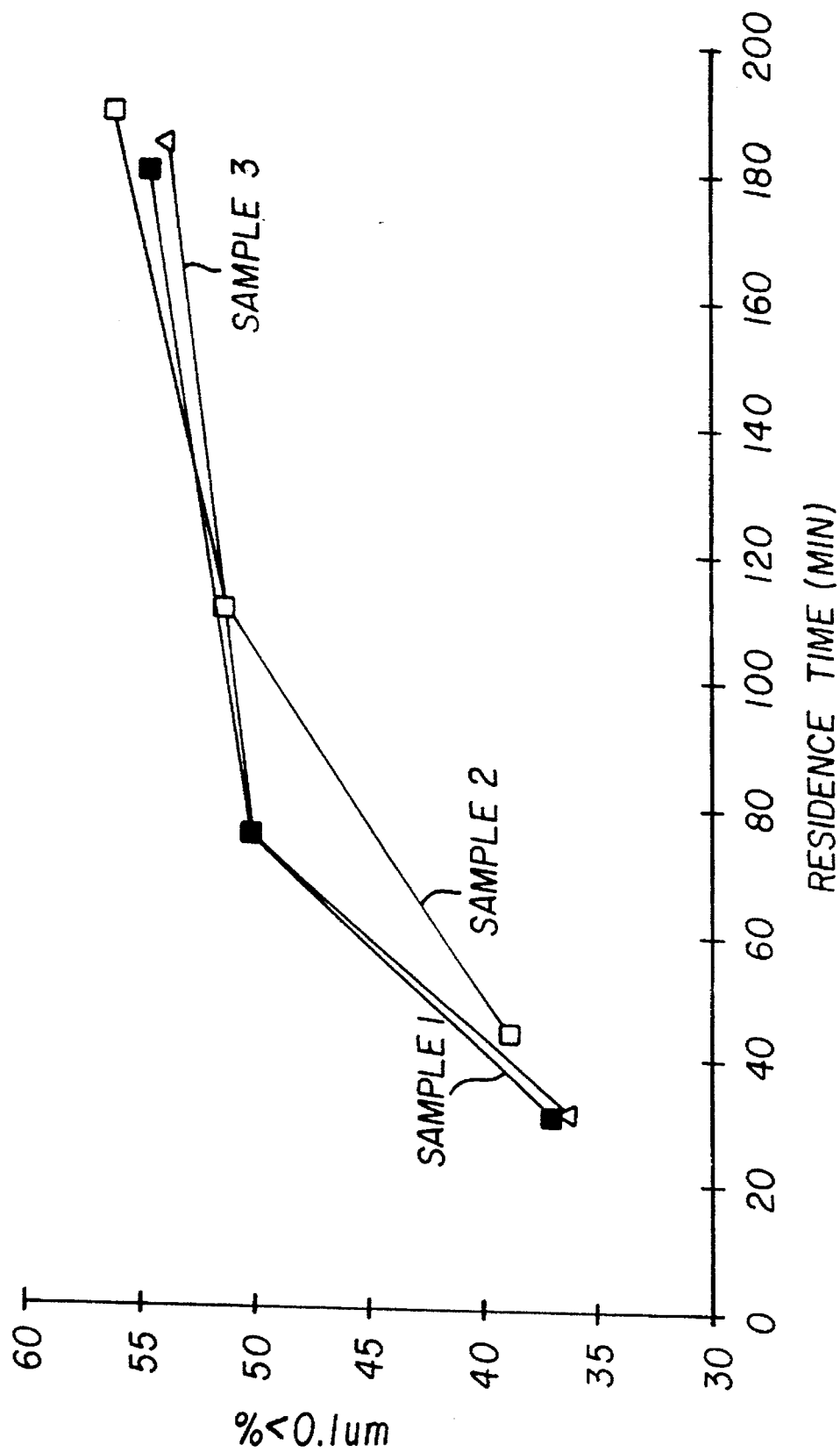
FIGS. 1–5 present the results obtained in Example 1 (below) in graph form.

This invention is based partly on the discovery that compounds useful in imaging elements can be prepared in extremely fine particles with reduced contamination levels by milling in the presence of milling media comprising a polymeric resin. The term "compounds useful in imaging elements" refers to compounds that can be used in photographic elements, electrophotographic elements, thermal transfer elements, and the like.

In the method of this invention a compound useful in imaging elements is prepared in the form of particles by milling the compound useful in imaging elements in the presence of a milling media comprising a polymeric resin.

The milling media can comprise particles, preferably substantially spherical in shape, e.g., beads, consisting essentially of the polymeric resin. Alternatively, the milling media can comprise particles comprising a core having a coating of the polymeric resin adhered thereon.

In general, polymeric resins suitable for use herein are chemically and physically inert, substantially free of metals, solvents and monomers, and of sufficient hardness and friability to enable them to avoid being chipped or crushed during milling. Suitable polymeric resins include cross linked polystyrenes, such as polystyrene cross linked with divinyl benzene, styrene copolymers, polycarbonates, polyacetals, such as Delrin™, vinyl chloride polymers and copolymers, polyurethanes, polyamides, poly(tetrafluoroethylenes), e.g., Teflon™, and other fluoropolymers, high density polyethylenes, polypropylenes, cellulose ethers and esters such as cellulose acetate, polyacrylates, such as polymethylmethacrylate,polyhydroxymethacrylate and polyhydroxyethyl acrylate, silicone containing polymers such as polysiloxanes and the like. The polymer can be biodegradable. Exemplary biodegradable polymers include poly(lactides), poly(glycolide), copolymers of lactides and glycolide, polyanhydrides, poly(hydroxyethyl methacrylate), poly(iminocarbonates), poly (N-acylhydroxyproline)esters, poly (N-palmitoyl hydroxyproline esters, ethylene-vinyl acetate copolymers, poly(orthoesters), poly(caprolactones), and poly(phosphazenes).

The polymeric resin can have a density from 0.8 to 3.0 g/cm$^3$. Higher density resins are preferred as it is believed that these provide more efficient particle size reduction.

The media can range in size from about 0.1 to about 3 mm. For fine milling, the particles preferably are from 0.2 to 2 mm, more preferably, 0.25 to 1 mm in size.

The core material can be selected from materials known to be useful as milling media when fabricated as spheres or particles. Suitable core materials include zirconium oxides (such as 95% zirconium oxide stabilized with magnesia or yttrium), zirconium silicate, glass stainless steel, titania, alumina, ferrite and the like. Preferred core materials have a density greater than about 2.5 g/cm$^3$. The selection of high density core materials is believed to facilitate efficient particle size reduction.

Useful thicknesses of the polymer coating on the core are believed to range from about 1 to 500 microns, although other thicknesses outside this range may be useful in some applications. The thickness of the polymer coating preferably is less than the diameter of the core.

The cores can be coated with the polymer resin by techniques known in the art. Suitable techniques include spray coating, fluidized bed coating, and melt coating. Adhesion promoting or tie layers can optionally be provided to improve the adhesion between the core material and the resin coating. The adhesion of the polymer coating to the core material can be enhanced by treating the core material to adhesion promoting procedures, such as roughening the core surface, corona discharge treatment, and the like.

The milling process can be a dry process, e.g., a dry roller milling process or a wet process, i.e., wet-milling. In preferred embodiments this invention is practiced in accordance with the wet-milling process described in U.S. Pat. No. 5,145,684 and European published application No. 498,482, the disclosures of which are incorporated herein by reference. Thus, the wet milling process can be practiced in conjunction with a liquid dispersion medium and surface modifier such as described in these publications. Useful liquid dispersion media include water, aqueous salt solutions, ethanol, butanol, hexane, glycol and the like. The surface modifier can be selected from known organic and inorganic materials such as described is U.S. Pat. No. 5,145,684 and can be present in an amount of 0.1–90%, preferably 1–80% by weight based on the total weight of the dry particles.

In preferred embodiments, the compound useful in imaging elements can be prepared in submicron or nanoparticulate particle size, e.g., less than about 500 nanometers (nm). In certain embodiments, particles having an average particle size of less than 300 nm have been prepared in accordance with the present invention. It was particularly surprising an unexpected that such fine particles could be prepared at such low levels of contamination.

Milling can take place in any suitable milling mill. Suitable mills include an airjet mill, a roller mill, a ball mill, a media mill an attritor mill, a vibratory mill, a planetary mill, a sand mill, and a bead mill. A high energy media mill is preferred when the milling media consists essentially of the polymeric resin. The mill can contain a rotation shaft.

The preferred proportions of the milling media, the compound useful in imaging elements and the optional liquid dispersion medium and surface modifier present in the milling vessel can vary with wide limits and depends for example of the particular compound useful in imaging elements selected, the size and density of the milling media, the type of mill selected etc. The process can be carried out in a continuous batch or semi-batch mode. In high energy media mills, it can be desirable to fill 70–90% of the volume of the milling chamber with milling media. On the other hand, in roller mills, it frequently is desirable to leave the milling vessel up to half filled with air, the remaining volume comprising the milling media and the liquid dispersion media, if present. This permits a cascading effect within the vessel on the rollers which permits efficient milling. However, when foaming is a problem during wet milling, the vessel can be completely filled with the liquid dispersion medium.

The attrition time can vary widely and depends primarily upon the particular photographically useful compound, mechanical means and residence conditions selected, the initial and desired particle size and so forth. For roller mills, processing times from several days to weeks may be required. On the other hand residence times of less than about 8 hours are generally required using high energy media mills.

After attrition is completed, the milling media is separated from the milled particulate product (in either a dry or liquid dispersion form) using conventional separation techniques, such as by filtration, sieving through a mesh screen and the like.

The process can be practiced with a wide variety of compounds useful in imaging elements. In the case of dry milling the compound useful in imaging elements should be capable of being formed into solid particles. In the case of wet milling the compound useful in imaging elements should be poorly soluble and dispersible in at least one liquid medium. By "poorly soluble", it is meant that the compound useful in imaging elements has a solubility in the liquid dispersion medium, e.g., water, of less that about 10 mg/ml, and preferably of less than about 1 mg/ml. The preferred liquid dispersion medium is water. additionally, the invention can be practiced with other liquid media.

In preferred embodiments of the invention the liquid dispersion medium comprises water and a surfactant. The surfactant used can be, for example, a polymeric dispersing aid described in copending applications Ser. Nos. 228,971, 229,267, and 228,839, all filed on Apr. 18, 1994, the disclosures of which are incorporated herein by reference. Other surfactants that can be used include:

$$CH_3(CH_2)_7-CH=CH(CH_2)_7-\overset{O}{\underset{\|}{C}}-N\overset{CH_3}{\underset{CH_2CH_2SO_3^-Na^+}{}}$$ SURF 1 a mixture of:

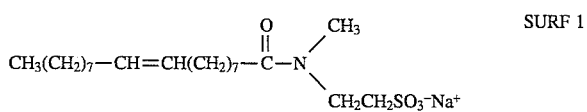 SURF 2 n = 1–3 and

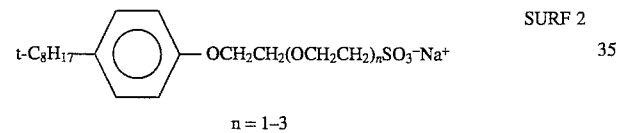

$$\begin{array}{c}CH_3CH_2\\|\\CH_3CH_2CH_2CH_2CH-CH_2-O-\overset{O}{\underset{\|}{C}}-CH-SO_3^-Na^+\\CH_3CH_2CH_2CH_2CH-CH_2-O-\overset{}{\underset{\|}{C}}-CH_2\\|\phantom{CH_3CH_2CH_2CH_2CH-CH_2-O-}\overset{\|}{O}\\CH_3CH_2\end{array}$$ SURF 3

$$\begin{array}{c}\phantom{xxx}CH-CH_2-COO^-Na^+\\\phantom{xxx}/\,|\\n\text{-}C_{18}H_{37}-N\phantom{x}COO^-Na^+\\|\\O=C\\|\\CH_2-CH-COO^-Na^+\\|\\SO_3^-Na^+\end{array}$$ SURF 4

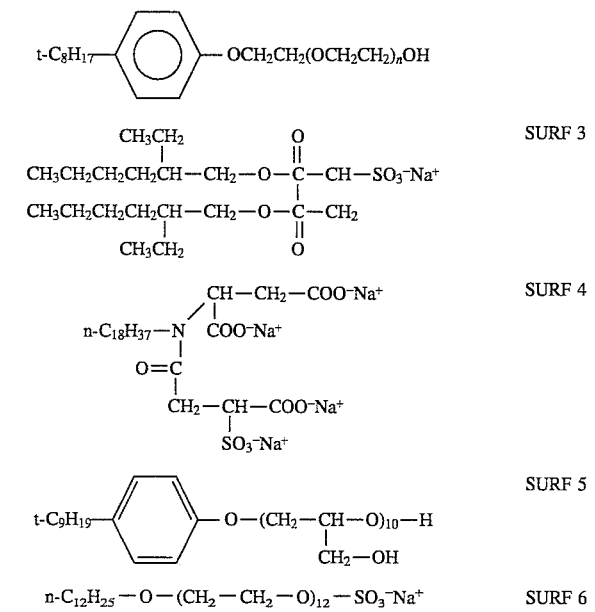 SURF 5

$$n\text{-}C_{12}H_{25}-O-(CH_2-CH_2-O)_{12}-SO_3^-Na^+$$ SURF 6

-continued

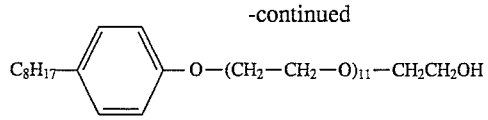 SURF 7

$$C_8H_{17}-\text{Ar}-O-(CH_2-CH_2-O)_{11}-CH_2CH_2OH$$

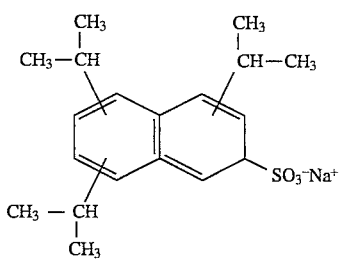 SURF 8

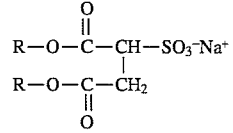 SURF 9 where R = CH(CH$_3$)C$_4$H$_9$

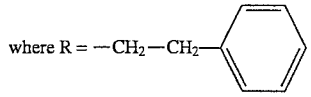 SURF 10 where R = —CH$_2$—CH$_2$—Ph

 SURF 11 where R = —CH$_2$—CH—CH$_3$ (Ph)

where R = —CH$_2$—CH(CH$_2$CH$_3$)C$_3$H$_7$ SURF 12 where R = —(CH$_2$)$_n$CH$_3$(n = 2,3&5) SURF 13

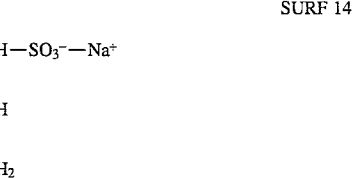 SURF 14 where R = —(CH$_2$)$_n$—Ph (n = 2–5)

$$n\text{-}C_{12}H_{25}-O-(CH_2-CH_2-O)_{22}-CH_2CH_2OH$$ SURF 15

$$\begin{array}{c}C_{12}H_{25}-O-(CH_2-CH_2-O)_{15}-CH_2\\|\\CH_2-SO_3^-Na^+\end{array}$$ SURF 16

$$\begin{array}{c}n\text{-}C_{12}H_{25}-O-(CH_2-CH_2-O)_n-\overset{O}{\underset{\|}{C}}-CH_2-SO_3^-Na^+\\|\\CH_2-COO^-Na^+\end{array}$$ SURF 17 n = 3–5

-continued

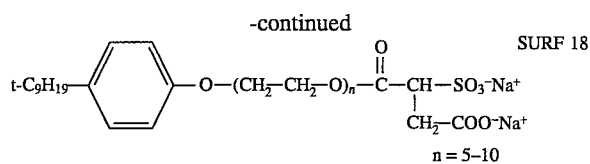
SURF 18
n = 5–10

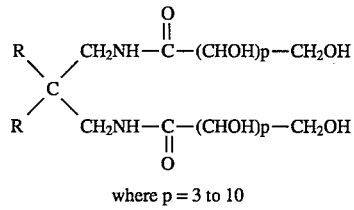
SURF19
where p = 3 to 10
where, R = n-CH$_3$—(CH$_2$)$_x$— (where x = 3–10) SURF 20

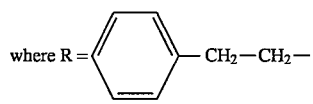
SURF 21

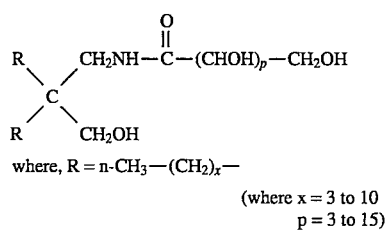
SURF 22
where, R = n-CH$_3$—(CH$_2$)$_x$—
(where x = 3 to 10
p = 3 to 15)

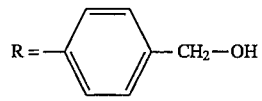

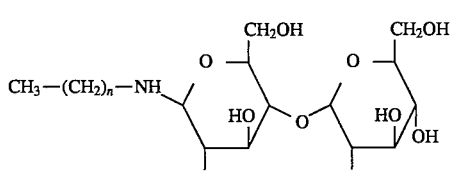
SURF 23
where, n = 3 to 15

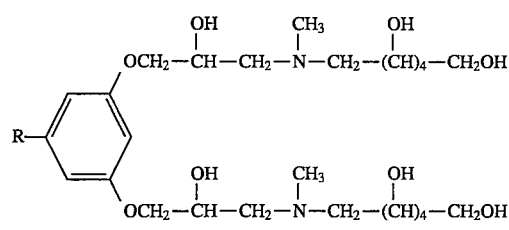
SURF 25

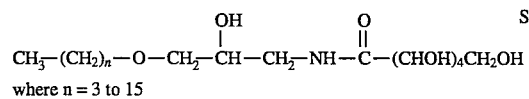
SURF 25
CH$_3$—(CH$_2$)$_n$—O—CH$_2$—CH—CH$_2$—NH—C—(CHOH)$_4$CH$_2$OH
where n = 3 to 15

-continued

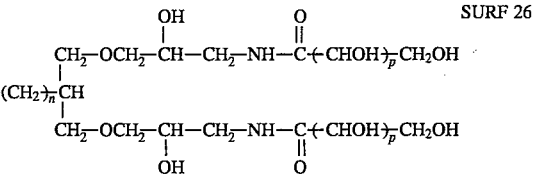
SURF 26
where, n = 2 to 12
p = 3 to 10

$$\begin{array}{c} O \\ \parallel \\ CH_2-NH-C-(CHOH)_p-CH_2OH \\ | \\ CH_2 \\ O \quad | \\ \parallel \quad | \\ CH_3-(CH_2)_n-C-N \\ | \\ CH_2 \\ | \\ CH_2-NH-C-(CHOH)_p-CH_2OH \\ \parallel \\ O \end{array}$$ SURF 27 where, n = 2 to 18
p = 3 to 10

$$\begin{array}{c} O \\ \parallel \\ CH_2-NH-C-(CHOH)_p-CH_2OH \\ | \\ CH_2 \\ O \quad | \\ \parallel \quad | \\ CH_3-(CH_2)_n-N-N-CH_2 \\ | \\ CH_3-(CH_2)_n-C-N-CH_2 \\ \parallel \quad | \\ O \quad CH_2 \\ | \\ CH_2-NH-C-(CHOH)_p-CH_2OH \\ \parallel \\ O \end{array}$$ SURF 28 where, n = 2 to 18
p = 3 to 10 t-C$_4$H$_9$—CH$_2$C(CH$_3$)$_2$—⟨phenyl⟩—OCH$_2$CH$_2$OCH$_2$CH$_2$
  |
  SO$_3^-$Na$^+$    SURF 29

CH$_3$—(CH$_2$)$_{11}$—SO$_4^-$Na$^+$    SURF 30

CH$_3$—(CH$_2$)$_{11}$—⟨phenyl-SO$_3^-$Na$^+$⟩    SURF 31

Suitable compounds useful in imaging elements include for example, dye-forming couplers, development inhibitor release couplers (DIR's), development inhibitor anchimeric release couplers (DI(A)R's), masking couplers, filter dyes, thermal transfer dyes, optical brighteners, nucleators, development accelerators, oxidized developer scavengers, ultraviolet radiation absorbing compounds, sensitizing dyes, development inhibitors, antifoggants, bleach accelerators, magnetic particles, lubricants, matting agents, etc.

Examples of such compounds can be found in Research Disclosure, December 1989, Item 308,119 published by Kenneth Mason Publications, Ltd., Dudley Annex, 12a North Street, Emsworth, Hampshire P010 7DQ, England, Sections VII and VIII, which are incorporated herein by reference, and in Research Disclosure, November 1992, Item 34390 also published by Kenneth Mason Publications and incorporated herein by reference.

Typical preferred compounds useful in imaging elements that can be used in solid particle dispersions in accordance with this invention are filter dyes, thermal transfer dyes and sensitizing dyes, such as those described below.

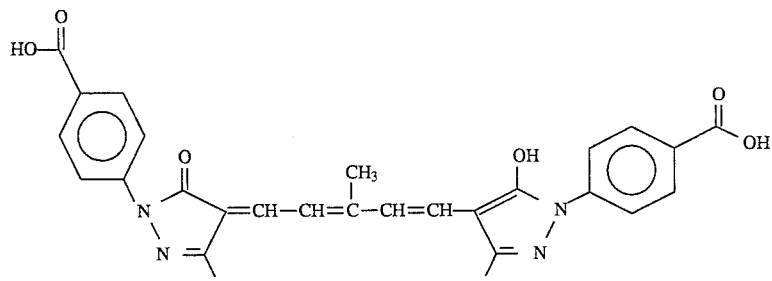
D-1

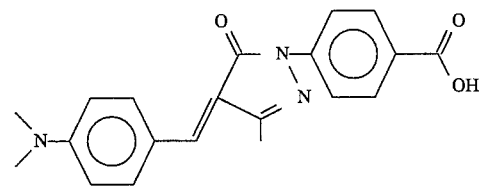
D-2

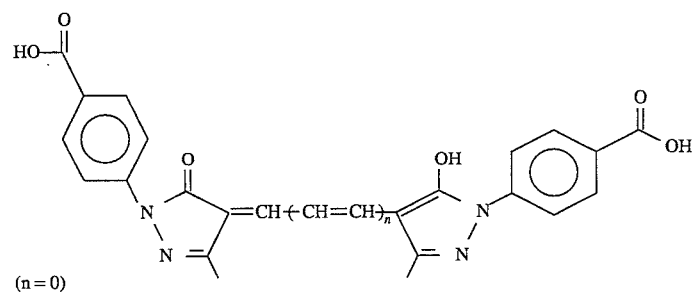
D-3
(n = 0)

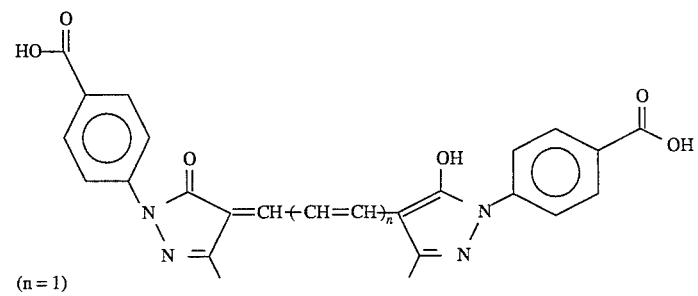
D-4
(n = 1)

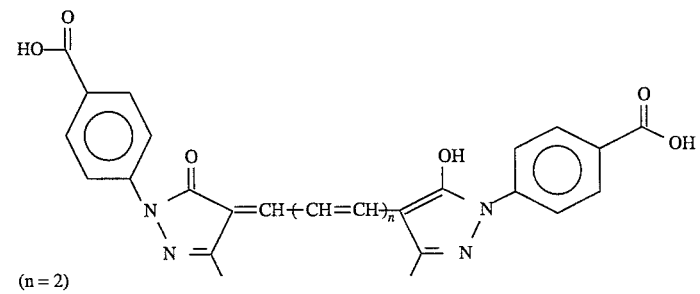
D-5
(n = 2)

-continued
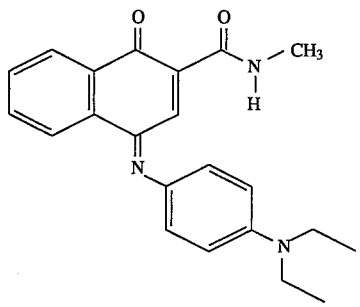
D-6
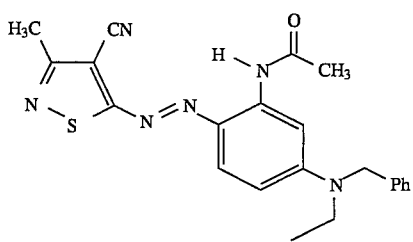
D-7
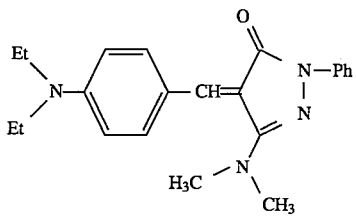
D-8
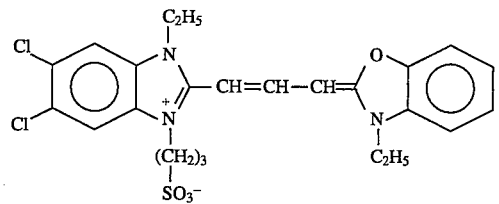
D-9
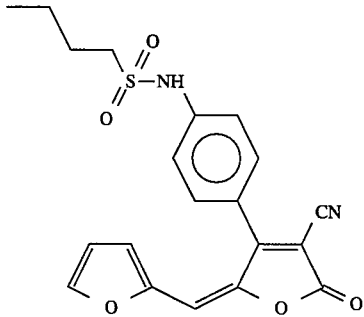
D-10
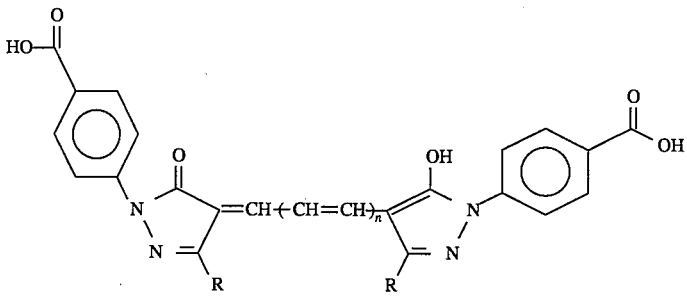
n = 0–2, R = C2–C10 alkyl, aryl
D-11

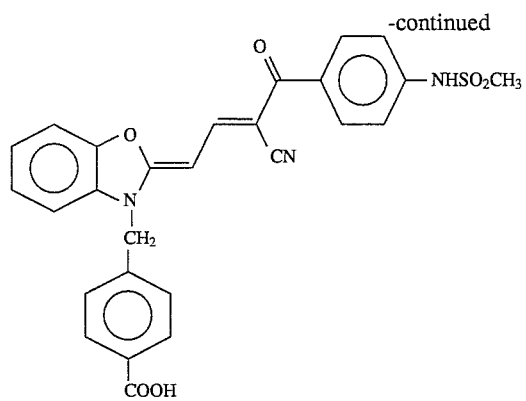
D-12
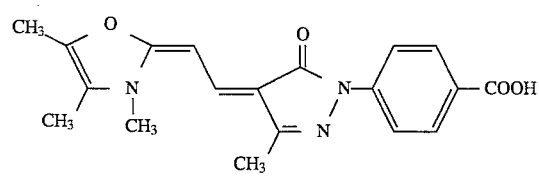
D-13
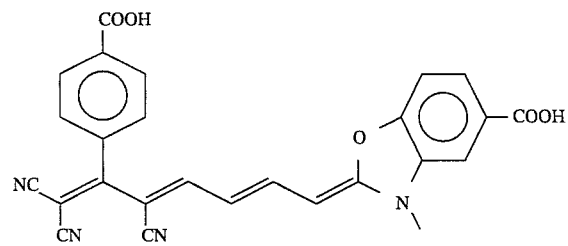
D-14
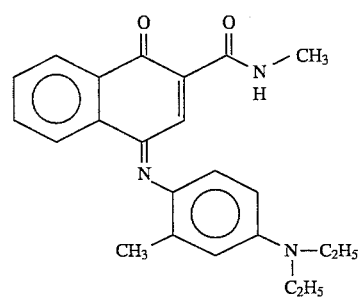
D-15
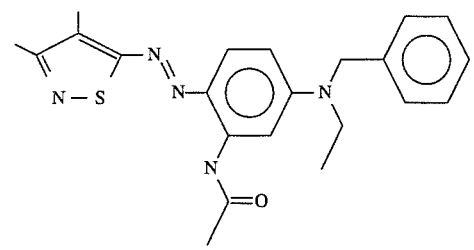
D-16

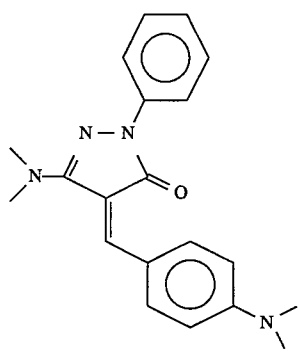

D-17

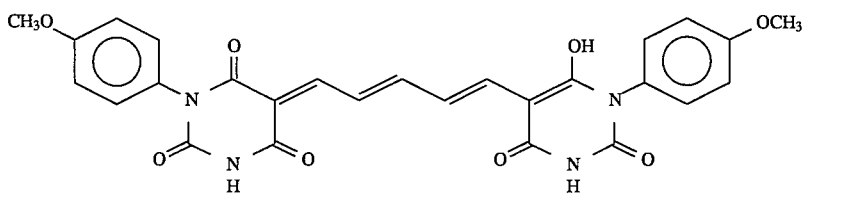

D-18

It is to be understood that this list is representative only, and not meant to be exclusive. In particularly preferred embodiments of the invention, the compound useful in imaging elements is a sensitizing dye, thermal transfer dye or filter dye.

In general, filter dyes that can be used in accordance with this invention are those described in European patent applications EP 549,089 of Texter et al, and EP 430,180 and U.S. Pat. Nos. 4,803,150; 4,855,221; 4,857,446; 4,900,652; 4,900,653; 4,940,654; 4,948,717; 4,948,718; 4,950,586; 4,988,611; 4,994,356; 5,098,820; 5,213,956; 5,260,179; and 5,266,454; (the disclosures of which are incorporated herein by reference).

In general, thermal transfer dyes that can be used in accordance with this invention include anthraquinone dyes, e.g., Sumikaron Violet RS® (product of Sumitomo Chemical Co., Ltd.), Dianix Fast Violet 3R-FS® (product of Mitsubishi Chemical Industries, Ltd.), and Kayalon Polyol Brilliant Blue N-BGM® and KST Black 146® (products of Nippon Kayaku Co., Ltd.); azo dyes such as Kayalon Polyol Brilliant Blue BM®, Kayalon Polyol Dark Blue 2BM®, and KST Black KR® (products of Nippon Kayaku Co., Ltd.), Sumikaron Diazo Black 5G® (product of Sumitomo Chemical Co., Ltd.), and Miktazol Black 5GH® (product of Mitsui Toatsu Chemicals, Inc.); direct dyes such as Direct Dark Green B® (product of Mitsubishi Chemical Industries, Ltd.) and Direct Brown M® and Direct Fast Black D® (products of Nippon Kayaku Co. Ltd.); acid dyes such as Kayanol Milling Cyanine 5R® (product of Nippon Kayaku Co. Ltd.); basic dyes such as Sumiacryl Blue 6G® (product of Sumitomo Chemical Co., Ltd.), and Aizen Malachite Green® (product of Hodogaya Chemical Co., Ltd.); or any of the dyes disclosed in U.S. Pat. Nos. 4,541,830, 4,698,651, 4,695,287, 4,701,439, 4,757,046, 4,743,582, 4,769,360, and 4,753,922, the disclosures of which are hereby incorporated by reference.

In general, sensitizing dyes that can be used in accordance with this invention include cyanine dyes, merocyanine dyes, complex cyanine dyes, complex merocyanine dyes, homopolar cyanine dyes, hemicyanine dyes, styryl dyes, and hemioxonol dyes. Of these dyes, cyanine dyes, merocyanine dyes and complex merocyanine dyes are particularly useful.

Any conventionally utilized nuclei for cyanine dyes are applicable to these dyes as basic heterocyclic nuclei. That is, a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus, a pyridine nucleus, etc., and further, nuclei formed by condensing alicyclic hydrocarbon rings with these nuclei and nuclei formed by condensing aromatic hydrocarbon rings with these nuclei, that is, an indolenine nucleus, a benzindolenine nucleus, an indole nucleus, a benzoxazole nucleus, a naphthoxazole nucleus, a benzothiazole nucleus, a naphthothiazole nucleus, a benzoselenazole nucleus, a benzimidazole nucleus, a quinoline nucleus, etc., are appropriate. The carbon atoms of these nuclei can also be substituted.

The merocyanine dyes and the complex merocyanine dyes that can be employed contain 5- or 6-membered heterocyclic nuclei such as pyrazolin-5-one nucleus, a thiohydantoin nucleus, a 2-thioxazolidin-2,4-dione nucleus, a thiazolidine-2,4-dione nucleus, a rhodanine nucleus, a thiobarbituric acid nucleus, and the like.

Solid particle dispersions of sensitizing dyes may be added to a silver halide emulsion together with dyes which themselves do not give rise to spectrally sensitizing effects but exhibit a supersensitizing effect or materials which do not substantially absorb visible light but exhibit a supersensitizing effect. For example, aminostilbene compounds substituted with a nitrogen-containing heterocyclic group (e.g., those described in U.S. Pat. Nos. 2,933,390 and 3,635,721), aromatic organic acid-formaldehyde condensates (e.g., those described in U.S. Pat. No. 3,743,510), cadmium salts, azaindene compounds, and the like, can be present.

The sensitizing dye may be added to an emulsion comprising silver halide grains and, typically, a hydrophilic colloid at any time prior to (e.g., during or after chemical sensitization) or simultaneous with the coating of the emulsion on a photographic support). The dye/silver halide emulsion may be mixed with a dispersion of color image-forming coupler immediately before coating or in advance of coating (for example, 2 hours). The above-described sensitizing dyes can be used individually, or may be used in combination, e.g. to also provide the silver halide with additional sensitivity to wavelengths of light outside that provided by one dye or to supersensitize the silver halide.

The dispersions of this invention can be used to prepare photographic elements. In preferred embodiments of this invention, a color photographic element comprises at least one layer comprising a dispersion of this invention. In addition to the dispersion of this invention, the photographic element comprises other components typically used in photographic elements.

The dispersions of the invention can be used in any of the ways and in any of the combinations known in the art. Typically, the invention dispersions are incorporated in a silver halide emulsion and the emulsion coated as a layer on a support to form part of a photographic element.

The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like.

If desired, the photographic element can be used in conjunction with an applied magnetic layer as described in Research Disclosure, November 1992, Item 34390 published by Kenneth Mason Publications, Ltd., Dudley Annex, 12a North Street, Emsworth, Hampshire P010 7DQ, ENGLAND.

In the following discussion of suitable materials for use in the dispersions and elements of this invention, reference will be made to *Research Disclosure,* December 1989, Item 308119, available as described above, which will be identified hereafter by the term "Research Disclosure." The contents of the Research Disclosure, including the patents and publications referenced therein, are incorporated herein by reference, and the Sections hereafter referred to are Sections of the Research Disclosure.

The silver halide emulsions employed in the photographic elements of this invention can be either negative-working or positive-working. Suitable emulsions and their preparation as well as methods of chemical and spectral sensitization are described in Sections I through IV. Color materials and development modifiers are described in Sections V and XXI. Vehicles are described in Section IX, and various additives such as brighteners, antifoggants, stabilizers, light absorbing and scattering materials, hardeners, coating aids, plasticizers, lubricants and matting agents are described , for example, in Sections V, VI, VIII, X, XI, XII, and XVI. Manufacturing methods are described in Sections XIV and XV, other layers and supports in Sections XIII and XVII, processing methods and agents in Sections XIX and XX, and exposure alternatives in Section XVIII.

Coupling-off groups are well known in the art. Such groups can determine the chemical equivalency of a coupler, i.e., whether it is a 2-equivalent or a 4-equivalent coupler, or modify the reactivity of the coupler. Such groups can advantageously affect the layer in which the coupler is coated, or other layers in the photographic recording material, by performing, after release from the coupler, functions such as dye formation, dye hue adjustment, development acceleration or inhibition, bleach acceleration or inhibition, electron transfer facilitation, color correction and the like.

The presence of hydrogen at the coupling site provides a 4-equivalent coupler, and the presence of another coupling-off group usually provides a 2-equivalent coupler. Representative classes of such coupling-off groups include, for example, chloro, alkoxy, aryloxy, hetero-oxy, sulfonyloxy, acyloxy, acyl, heterocyclyl, sulfonamido, mercaptotetrazole, benzothiazole, mercaptopropionic acid, phosphonyloxy, arylthio, and arylazo. These coupling-off groups are described in the art, for example, in U.S. Pat. Nos. 2,455,169, 3,227,551, 3,432,521, 3,476,563, 3,617,291, 3,880,661, 4,052,212 and 4,134,766; and in U.K. Patents and published application Nos. 1,466,728, 1,531,927, 1,533,039, 2,006,755A and 2,017,704A, the disclosures of which are incorporated herein by reference.

Image dye-forming couplers may be included in the element such as couplers that form cyan dyes upon reaction with oxidized color developing agents which are described in such representative patents and publications as: U.S. Pat. Nos. 2,772,162, 2,895,826, 3,002,836, 3,034,892, 2,474,293, 2,423,730, 2,367,531, 3,041,236, 4,883,746 and "Farbkuppler-eine LiteratureUbersicht," published in Agfa Mitteilungen, Band III, pp. 156–175 (1961). Preferably such couplers are phenols and naphthols that form cyan dyes on reaction with oxidized color developing agent.

Couplers that form magenta dyes upon reaction with oxidized color developing agent are described in such representative patents and publications as: U.S. Pat. Nos. 2,600,788, 2,369,489, 2,343,703, 2,311,082, 3,152,896, 3,519,429, 3,062,653, 2,908,573 and "Farbkuppler-eine LiteratureUbersicht," published in Agfa Mitteilungen, Band III, pp. 126–156 (1961). Preferably such couplers are pyrazolones, pyrazolotriazoles, or pyrazolobenzimidazoles that form magenta dyes upon reaction with oxidized color developing agents.

Couplers that form yellow dyes upon reaction with oxidized and color developing agent are described in such representative patents and publications as: U.S. Pat. Nos. 2,875,057, 2,407,210, 3,265,506, 2,298,443, 3,048,194, 3,447,928 and "Farbkuppler-eine LiteratureUbersicht," published in Agfa Mitteilungen, Band III, pp. 112–126 (1961). Such couplers are typically open chain ketomethylene compounds.

It may be useful to use a combination of couplers any of which may contain known ballasts or coupling-off groups such as those described in U.S. Pat. Nos. 4,301,235; 4,853,319 and 4,351,897. The coupler may also be used in association with "wrong" colored couplers (e.g. to adjust levels of interlayer correction) and, in color negative applications, with masking couplers such as those described in EP 213.490; Japanese Published Application 58-172,647; U.S. Pat. No. 2,983,608; German Application DE 2,706,117C; U.K. Patent 1,530,272; Japanese Application A-113935; U.S. Pat. Nos. 4,070,191 and 4,273,861; and German Application DE 2,643,965. The masking couplers may be shifted or blocked.

The invention dispersions may also be used in association with materials that accelerate or otherwise modify the processing steps e.g. of bleaching or fixing to improve the quality of the image. Bleach accelerator releasing couplers such as those described in EP 193,389; EP 301,477; U.S. Pat. Nos. 4,163,669; 4,865,956; and 4,923,784, may be useful. Also contemplated is use of the compositions in association with nucleating agents, development accelerators or their precursors (UK Patent 2,097,140; U.K. Patent 2,131,188); electron transfer agents (U.S. Pat. Nos. 4,859,578; 4,912, 025); antifogging and anti color-mixing agents such as derivatives of hydroquinones, aminophenols, amines, gallic acid; catechol; ascorbic acid; hydrazides; sulfonamidophenols; and non color-forming couplers.

For example, in a color negative element, the dispersions of the invention may replace or supplement the materials of an element comprising a support bearing the following layers from top to bottom:

(1) one or more overcoat layers containing ultraviolet absorber(s);

(2) a two-coat yellow pack with a fast yellow layer containing "Coupler 1": Benzoic acid, 4-chloro-3-((2-(4-ethoxy-2,5-dioxo-3-(phenylmethyl)-1-imidazolidinyl)-3-(4-methoxyphenyl)-1,3-dioxopropyl)amino)-, dodecyl ester and a slow yellow layer containing the same compound together with "Coupler 2": Propanoic acid, 2-[[5-[[4-[2-[[[2,4-bis(1,1-dimethylpropyl)phenoxy]acetyl]amino]-5-[(2,2,3,3,4,4,4-heptafluoro-1-oxobutyl)amino]-4-hydroxyphenoxy]-2,3-dihydroxy-6-[(propylamino)carbonyl ]phenyl]thio]-1,3,4-thiadiazol-2-yl]thio]-, methyl ester and "Coupler 3": 1-((dodecyloxy)carbonyl) ethyl(3-chloro-4-((3-(2-chloro-4-((1-tridecanoylethoxy) carbonyl)anilino)-3-oxo-2-((4)(5)(6)-(phenoxycarbonyl)-1H-benzotriazol-1-yl)propanoyl)amino))benzoate;

(3) an interlayer containing fine metallic silver;

(4) a triple-coat magenta pack with a fast magenta layer containing "Coupler 4": Benzamide, 3-((2-(2,4-bis(1,1-dimethylpropyl)phenoxy)-1-oxobutyl)amino)-N-(4,5-dihydro-5-oxo-1-(2,4,6-trichlorophenyl)-1H-pyrazol-3-yl)-,"Coupler 5": Benzamide, 3-((2-(2,4-bis(1,1-dimethylpropyl)phenoxy)-1-oxobutyl)amino)-N-(4',5'-dihydro-5'-oxo-1'-(2,4,6-trichlorophenyl) (1,4'-bi-1H-pyrazol)-3'-yl)-,"Coupler 6": Carbamic acid, (6-(((3-(dodecyloxy)propyl) amino)carbonyl)-5-hydroxy-1-naphthalenyl)-, 2-methylpropyl ester , "Coupler 7": Acetic acid, ((2-((3-(((3-(dodecyloxy)propyl)amino) carbonyl)-4-hydroxy-8-(((2-methylpropoxy)carbonyl) amino)-1-naphthalenyl)oxy )ethyl)thio)-, and "Coupler 8" Benzamide, 3-((2-(2,4-bis(1,1-dimethylpropyl) phenoxy)-1-oxobutyl)amino)-N-(4,5-dihydro-4-((4-methoxyphenyl) azo)-5-oxo-1-(2,4,6-trichlorophenyl)-1H-pyrazol-3-yl)-; a mid-magenta layer and a slow magenta layer each containing "Coupler 9": a ternary copolymer containing by weight in the ratio 1:1:2 2-Propenoic acid butyl ester, styrene, and N-[1-(2,4,6-trichlorophenyl)-4,5-dihydro-5-oxo-1H-pyrazol-3-yl]-2-methyl-2-propenamide; and "Coupler 10": Tetradecanamide, N-(4-chloro-3-((4-((4-((2,2-dimethyl-1-oxopropyl) amino)phenyl)azo)-4,5-dihydro-5-oxo-1(2, 4,6-trichlorophenyl)-1H-pyrazol-3-yl)amino)phenyl)-, in addition to Couplers 3 and 8; (5) an interlayer; (6) a triple-coat cyan pack with a fast cyan layer containing Couplers 6 and 7; a mid-cyan containing Coupler 6 and "Coupler 11": 2,7-Naphthalenedisulfonic acid, 5-(acetylamino)-3-((4-(2-((3-(((3-(2,4-bis(1,1-dimethylpropyl)phenoxy) propyl)amino)carbonyl)-4-hydroxy-1-naphthalenyl) oxy)ethoxy)phenyl)azo)-4-hydroxy-, disodium salt; and a slow cyan layer containing Couplers 2 and 6;

(7) an undercoat layer containing Coupler 8; and (8) an antihalation layer.

In a color paper format, the dispersions of the invention may replace or supplement the materials of an element comprising a support bearing the following layers from top to bottom:

(1) one or more overcoats;

(2) a cyan layer containing "Coupler 1": Butanamide, 2-(2,4-bis(1,1-dimethylpropyl)phenoxy)-N-(3,5-dichloro-2-hydroxy-4-methylphenyl)-, "Coupler 2": Acetamide, 2-(2,4-bis(1,1-dimethylpropyl)phenoxy)-N-(3,5-dichloro-2-hydroxy-4-, and UV Stabilizers: Phenol, 2-(5-chloro-2H-benzotriazol-2-yl)-4,6-bis(1,1-dimethylethyl)-; Phenol, 2-(2H-benzotriazol-2-yl)-4-(1,1-dimethylethyl)-;Phenol, 2-(2H-benzotriazol-2-yl)-4-(1,1-dimethylethyl)-6-(1-methylpropyl)-; and Phenol, 2-(2H-benzotriazol-2-yl)-4,6-bis(1,1-dimethylpropyl)- and a poly(t-butylacrylamide) dye stabilizer;

(3) an interlayer;

(4) a magenta layer containing "Coupler 3": Octanamide, 2-[2,4-bis(1,1-dimethylpropyl)phenoxy]-N-[2-(7-chloro-6-methyl-1H-pyrazolo[1,5-b][1,2,4]triazol-2-yl)propyl]- together with 1,1'-Spirobi(1H-indene), 2,2', 3,3'-tetrahydro-3,3,3',3'-tetramethyl-5,5',6,6'-tetrapropoxy-;

(5) an interlayer; and (6) a yellow layer containing "Coupler 4": 1-Imidazolidineacetamide, N-(5-((2-(2,4-bis(1,1-dimethylpropyl)phenoxy)-1-oxobutyl)amino)-2-chlorophenyl)-.alpha.-(2,2-dimethyl-1-oxopropyl)-4-ethoxy-2,5-dioxo-3-(phenylmethyl)-.

In a reversal format, the dispersions of the invention may replace or supplement the materials of an element comprising a support bearing the following layers from top to bottom:

( 1) one or more overcoat layers;

( 2) a nonsensitized silver halide containing layer;

(3) a triple-coat yellow layer pack with a fast yellow layer containing "Coupler 1": Benzoic acid, 4-(1-(((2-chloro-5-((dodecylsulfonyl)amino)phenyl) amino)carbonyl)-3,3-dimethyl-2-oxobutoxy)-, 1-methylethyl ester; a mid yellow layer containing Coupler 1 and "Coupler 2": Benzoic acid, 4-chloro-3-[[2-[4-ethoxy-2,5-dioxo-3-(phenylmethyl)-1-imidazolidinyl]-4,4-dimethyl-1,3-dioxopentyl]amino]-, dodecylester; and a slow yellow layer also containing Coupler 2;

(4) an interlayer;

(5) a layer of fine-grained silver;

(6) an interlayer;

(7) a triple-coated magenta pack with a fast magenta layer containing "Coupler 3": 2-Propenoic acid, butyl ester, polymer with N-[1-(2,5-dichlorophenyl)-4,5-dihydro-5-oxo-1H-pyrazol-3-yl]-2-methyl-2propenamide; "Coupler 4": Benzamide, 3-((2-(2,4-bis(1,1-dimethylpropyl)phenoxy)-1-oxobutyl)amino)-N-(4,5-dihydro-5-oxo-1-(2,4,6-trichlorophenyl)-1H-pyrazol-3-yl)-; and "Coupler 5": Benzamide, 3-(((2,4bis(1,1-dimethylpropyl)phenoxy)acetyl)amino)-N-(4,5-dihydro-5-oxo-1-(2,4,6-trichlorophenyl)-1H-pyrazol-3-yl)-; and containing the stabilizer 1,1'-Spirobi(1H-indene), 2,2', 3,3'-tetrahydro-3,3,3',3'-tetramethyl-5,5',6,6'-tetrapropoxy-; and in the slow magenta layer Couplers 4 and 5 with the same stabilizer;

(8) one or more interlayers possibly including fine-grained nonsensitized silver halide;

(9) a triple-coated cyan pack with a fast cyan layer containing "Coupler 6": Tetradecanamide, 2-(2-cyanophenoxy)-N-(4-((2,2,3,3,4,4,4-heptafluoro-1-oxobutyl)amino)-3-hydroxyphenyl)-; a mid cyan containing"Coupler 7": Butanamide, N-(4-((2-(2,4-bis(1,1-dimethylpropyl)phenoxy)-1-oxobutyl)amino)-2-hydroxyphenyl)-2,2,3,3,4,4,4-heptafluoro- and "Coupler 8": Hexanamide, 2-(2,4-bis (1,1-dimethylpropyl) phenoxy)-N-(4-((2,2,3,3,4,4,4-heptafluoro-1-oxobutyl)amino)-3-hydroxyphenyl)-;

(10) one or more interlayers possibly including fine-grained nonsensitized silver halide; and

(11) an antihalation layer.

The invention dispersions may also be used in combination with filter dye layers comprising colloidal silver sol or yellow, cyan, and/or magenta filter dyes, either as oil-in-water dispersions, latex dispersions or as solid particle dispersions. Additionally, they may be used with "smearing" couplers (e.g. as described in U.S. Pat. No. 4,366,237; EP 96,570; U.S. Pat. Nos. 4,420,556; and 4,543,323.) Also, the compositions may be blocked or coated in protected form as described, for example, in Japanese Application 61/258,249 or U.S. Pat. No. 5,019,492.

The invention dispersions may further be used in combination with image-modifying compounds such as "Developer Inhibitor-Releasing" compounds (DIR's). DIR's useful in conjunction with the compositions of the invention are known in the art and examples are described in U.S. Pat. Nos. 3,137,578; 3,148,022; 3,148,062; 3,227,554; 3,384, 657; 3,379,529; 3,615,506; 3,617,291; 3,620,746; 3,701, 783; 3,733,201; 4,049,455; 4,095,984; 4,126,459; 4,149, 886; 4,150,228; 4,211,562; 4,248,962; 4,259,437; 4,362, 878; 4,409,323; 4,477,563; 4,782,012; 4,962,018; 4,500, 634; 4,579,816; 4,607,004; 4,618,571; 4,678,739; 4,746, 600; 4,746,601; 4,791,049; 4,857,447; 4,865,959; 4,880, 342; 4,886,736; 4,937,179; 4,946,767; 4,948,716; 4,952, 485; 4,956,269; 4,959,299; 4,966,835; 4,985,336 as well as in patent publications GB 1,560,240 ; GB 2,007,662; GB 2,032,914; GB 2,099,167; DE 2,842,063, DE 2,937,127; DE 3,636,824; DE 3,644,416 as well as the following European Patent Publications: 272,573; 335,319; 336,411; 346, 899; 362, 870; 365,252; 365,346; 373,382; 376,212; 377,463; 378,236; 384,670; 396,486; 401,612; 401,613.

Such compounds are also disclosed in "Developer-Inhibitor-Releasing (DIR) Couplers for Color Photography," C. R. Barr, J. R. Thirtle and P. W. Vittum in *Photographic Science and Engineering,* Vol. 13, p. 174 (1969), incorporated herein by reference. Generally, the developer inhibitor-releasing (DIR) couplers include a coupler moiety and an inhibitor coupling-off moiety (IN). The inhibitor-releasing couplers may be of the time-delayed type (DIAR couplers) which also include a timing moiety or chemical switch which produces a delayed release of inhibitor. Examples of typical inhibitor moieties are: oxazoles, thiazoles, diazoles, triazoles, oxadiazoles, thiadiazoles, oxathiazoles, thiatriazoles, benzotriazoles, tetrazoles, benzimidazoles, indazoles, isoindazoles, mercaptotetrazoles, selenotetrazoles, mercaptobenzothiazoles, selenobenzothiazoles, mercaptobenzoxazoles, selenobenzoxazoles, mercaptobenzimidazoles, selenobenzimidazoles, benzodiazoles, mercaptooxazoles, mercaptothiadiazoles, mercaptothiazoles, mercaptotriazoles, mercaptooxadiazoles, mercaptodiazoles, mercaptooxathiazoles, telleurotetrazoles or benzisodiazoles. In a preferred embodiment, the inhibitor moiety or group is selected from the following formulas:

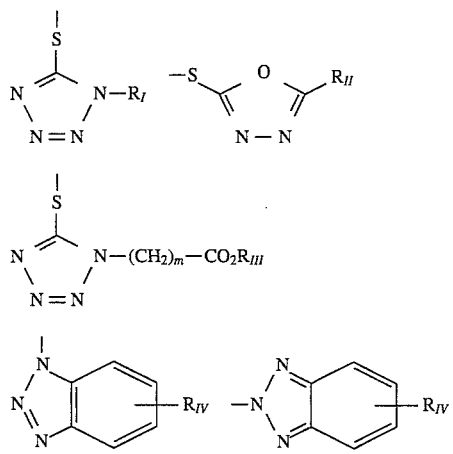

wherein $R_I$ is selected from the group consisting of straight and branched alkyls of from 1 to about 8 carbon atoms, benzyl, phenyl, and alkoxy groups and such groups containing none, one or more than one such substituent; $R_{II}$ is selected from $R_I$ and —$SR_I$; $R_{III}$ is a straight or branched alkyl group of from 1 to about 5 carbon atoms and m is from 1 to 3; and $R_{IV}$ is selected from the group consisting of hydrogen, halogens and alkoxy, phenyl and carbonamido groups, —$COOR_V$ and —$NHCOOR_V$ wherein $R_V$ is selected from substituted and unsubstituted alkyl and aryl groups.

Although it is typical that the coupler moiety included in the developer inhibitor-releasing coupler forms an image dye corresponding to the layer in which it is located, it may also form a different color as one associated with a different film layer. It may also be useful that the coupler moiety included in the developer inhibitor-releasing coupler forms colorless products and/or products that wash out of the photographic material during processing (so-called "universal" couplers).

As mentioned, the developer inhibitor-releasing coupler may include a timing group which produces the time-delayed release of the inhibitor group such as groups utilizing the cleavage reaction of a hemiacetal (U.S. Pat. No. 4,146,396, Japanese Applications 60-249148; 60-249149); groups using an intramolecular nucleophilic substitution reaction (U.S. Pat. No. 4,248,962); groups utilizing an electron transfer reaction along a conjugated system (U.S. Pat. Nos. 4,409,323; 4,421,845; Japanese Applications 57-188035; 58-98728; 58-209736; 58-209738) groups utilizing ester hydrolysis (German Patent Application (OLS) No. 2,626,315; groups utilizing the cleavage of imino ketals (U.S. Pat. No. 4,546,073); groups that function as a coupler or reducing agent after the coupler reaction (U.S. Pat. No. 4,438,193; U.S. Pat. No. 4,618,571) and groups that combine the features describe above. It is typical that the timing group or moiety is of one of the formulas:

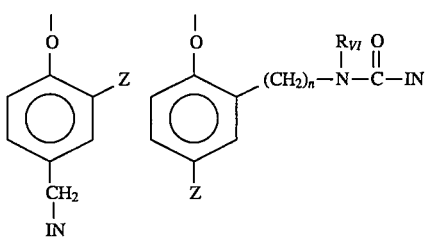

wherein IN is the inhibitor moiety, Z is selected from the group consisting of nitro, cyano, alkylsulfonyl; sulfamoyl (—$SO_2NR_2$); and sulfonamido (—$NRSO_2R$) groups; n is 0 or 1; and $R_{VI}$ is selected from the group consisting of substituted and unsubstituted alkyl and phenyl groups. The oxygen atom of each timing group is bonded to the coupling-off position of the respective coupler moiety of the DIAR.

Suitable developer inhibitor-releasing couplers for use in the present invention include, but are not limited to, the following:

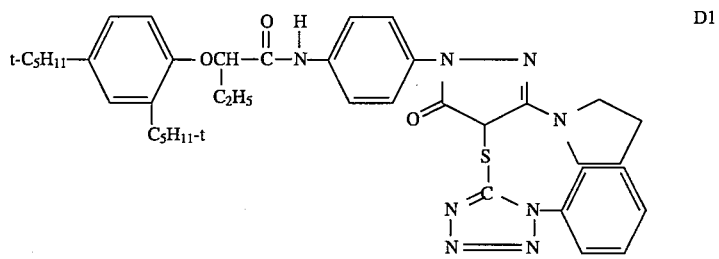

D1

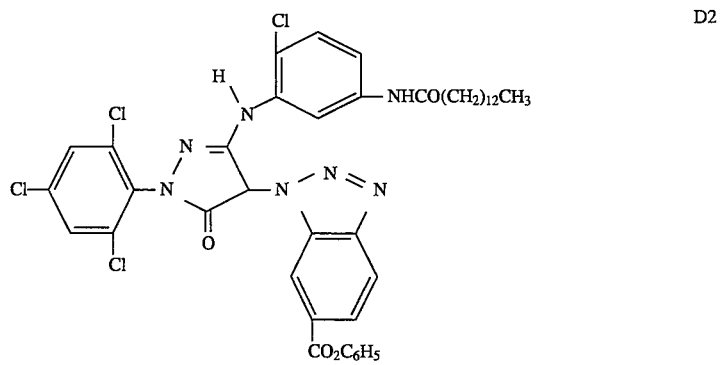

D2

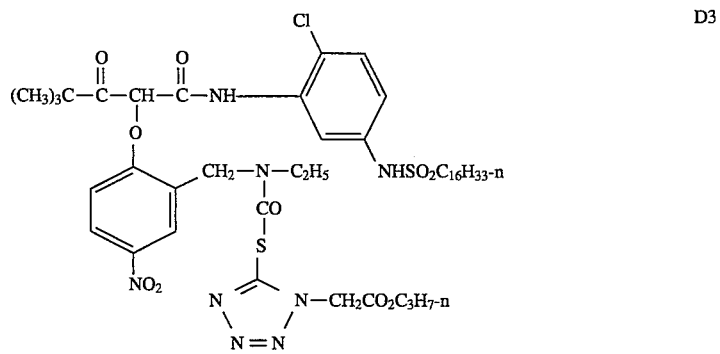

D3

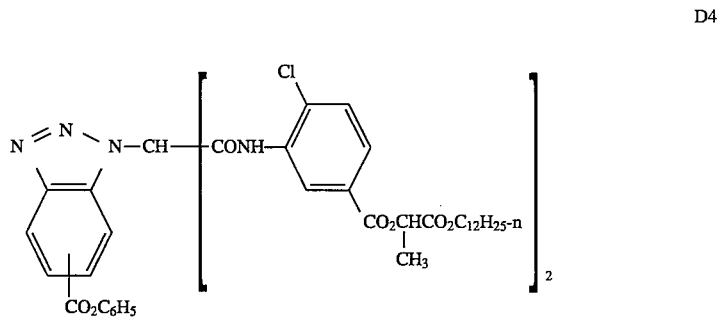

D4

-continued
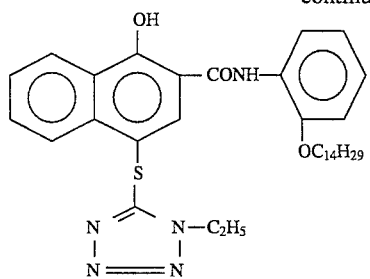
D5
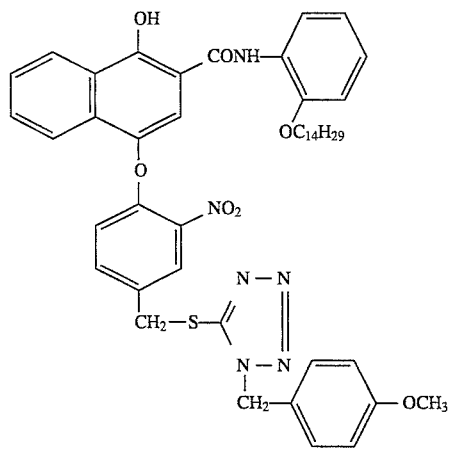
D6
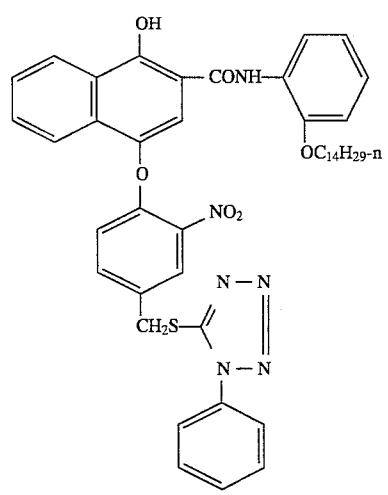
D7
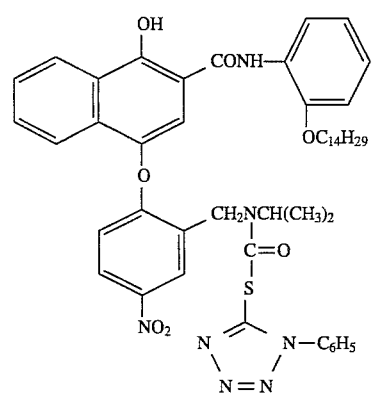
D8

-continued

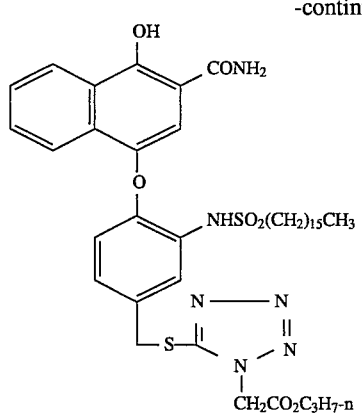

D9

It is also contemplated that the concepts of the present invention may be employed to obtain reflection color prints as described in *Research Disclosure*, November 1979, Item 18716, available from Kenneth Mason Publications, Ltd, Dudley Annex, 12a North Street, Emsworth, Hampshire P0101 7DQ, England, incorporated herein by reference. Dispersions of the invention may be coated on pH adjusted support as described in U.S. Pat. No. 4,917,994; with epoxy solvents (EP 0 164 961); with nickel complex stabilizers (U.S. Pat. Nos. 4,346,165; 4,540,653 and 4,906,559 for example); with ballasted chelating agents such as those in U.S. Pat. No. 4,994,359 to reduce sensitivity to polyvalent cations such as calcium; and with stain reducing compounds such as described in U.S. Pat. No. 5,068,171. Other compounds useful in combination with the invention are disclosed in Japanese Published Applications described in Derwent Abstracts having accession numbers as follows: 90-072,629, 90-072,630; 90-072,631; 90-072,632; 90-072,633; 90-072,634; 90-077,822; 90-078,229; 90-078,230; 90-079,336; 90-079,337; 90-079,338; 90-079,690; 90-079,691; 90-080,487; 90-080,488; 90-080,489; 90-080,490; 90-080,491; 90-080,492; 90-080,494; 90-085,928; 90-086,669; 90-086,670; 90-087,360; 90-087,361; 90-087,362; 90-087,363; 90-087,364; 90-088,097; 90-093,662; 90-093,663; 90-093,664; 90-093,665; 90-093,666; 90-093,668; 90-094,055; 90-094,056; 90-103,409; 83-62,586; 83-09,959.

Especially useful in this invention are tabular grain silver halide emulsions. Specifically contemplated tabular grain emulsions are those in which greater than 50 percent of the total projected area of the emulsion grains are accounted for by tabular grains having a thickness of less than 0.3 micron (0.5 micron for blue sensitive emulsion) and an average tabularity (T) of greater than 25 (preferably greater than 100), where the term "tabularity" is employed in its art recognized usage as $$T = ECD/t^2$$

where

ECD is the average equivalent circular diameter of the tabular grains in microns and t is the average thickness in microns of the tabular grains.

The average useful ECD of photographic emulsions can range up to about 10 microns, although in practice emulsion ECD's seldom exceed about 4 microns. Since both photographic speed and granularity increase with increasing ECD's, it is generally preferred to employ the smallest tabular grain ECD's compatible with achieving aim speed requirements.

Emulsion tabularity increases markedly with reductions in tabular grain thickness. It is generally preferred that aim tabular grain projected areas be satisfied by thin (t<0.2 micron) tabular grains. To achieve the lowest levels of granularity it is preferred that aim tabular grain projected areas be satisfied with ultrathin (t<0.06 micron) tabular grains. Tabular grain thicknesses typically range down to about 0.02 micron. However, still lower tabular grain thicknesses are contemplated. For example, Daubendiek et al U.S. Pat. No. 4,672,027 reports a 3 mole percent iodide tabular grain silver bromoiodide emulsion having a grain thickness of 0.017 micron.

As noted above tabular grains of less than the specified thickness account for at least 50 percent of the total grain projected area of the emulsion. To maximize the advantages of high tabularity it is generally preferred that tabular grains satisfying the stated thickness criterion account for the highest conveniently attainable percentage of the total grain projected area of the emulsion. For example, in preferred emulsions, tabular grains satisfying the stated thickness criteria above account for at least 70 percent of the total grain projected area. In the highest performance tabular grain emulsions, tabular grains satisfying the thickness criteria above account for at least 90 percent of total grain projected area.

Suitable tabular grain emulsions can be selected from among a variety of conventional teachings, such as those of the following: Research Disclosure, Item 22534, January 1983, published by Kenneth Mason Publications, Ltd., Emsworth, Hampshire P010 7DD, England; U.S. Pat. Nos. 4,439,520; 4,414,310; 4,433,048; 4,643,966; 4,647,528; 4,665,012; 4,672,027; 4,678,745; 4,693,964; 4,713,320; 4,722,886; 4,755,456; 4,775,617; 4,797,354; 4,801,522; 4,806,461; 4,835,095; 4,853,322; 4,914,014; 4,962,015; 4,985,350; 5,061,069 and 5,061,616. In addition, use of [100] silver chloride emulsions as described in EP 534,395 are specifically contemplated.

The emulsions can be surface-sensitive emulsions, i.e., emulsions that form latent images primarily on the surfaces of the silver halide grains, or the emulsions can form internal latent images predominantly in the interior of the silver halide grains. The emulsions can be negative-working emulsions, such as surface-sensitive emulsions or unfogged internal latent image-forming emulsions, or direct-positive emulsions of the unfogged, internal latent image-forming type, which are positive-working when development is conducted with uniform light exposure or in the presence of a nucleating agent.

Photographic elements can be exposed to actinic radiation, typically in the visible region of the spectrum, to form a latent image and can then be processed to form a visible dye image. Processing to form a visible dye image includes the step of contacting the element with a color developing agent to reduce developable silver halide and oxidize the color developing agent. Oxidized color developing agent in turn reacts with the coupler to yield a dye.

With negative-working silver halide, the processing step described above provides a negative image. The described elements can be processed in the known C-41 color process as described in The British Journal of Photography Annual of 1988, pages 191–198. Where applicable, the element may be processed in accordance with color print processes such a the RA-4 process of Eastman Kodak Company as described in the British Journal of Photography Annual of 1988, Pp 198–199. To provide a positive (or reversal) image, the color development step can be preceded by development with a non-chromogenic developing agent to develop exposed silver halide, but not form dye, and followed by uniformly fogging the element to render unexposed silver halide developable. Alternatively, a direct positive emulsion can be employed to obtain a positive image.

Preferred color developing agents are p-phenylenediamines such as:
4-amino-N,N-diethylaniline hydrochloride,
4-amino-3-methyl-N,N-diethylaniline hydrochloride,
4-amino-3-methyl-N-ethyl-N-(b-(methanesulfonamido)ethyl)aniline sesquisulfate hydrate,
4-amino-3-methyl-N-ethyl-N-(b-hydroxyethyl)aniline sulfate,
4-amino-3-b-(methanesulfonamido)ethyl-N,N-diethylaniline hydrochloride and
4-amino-N-ethyl-N-(2-methoxyethyl)-m-toluidine di-p-toluene sulfonic acid.

Development is usually followed by the conventional steps of bleaching, fixing, or bleach-fixing, to remove silver or silver halide, washing, and drying.

The following examples illustrate the process of this invention.

Polymeric Media Preparation

Inhibitor is removed from a mixture of 9.72 kg of styrene and 38.88 kg divinylbenzene by slurrying with 1.95 kg of basic aluminum oxide (55% grade from Dow Chemical Co.) for 15 minutes followed by filtering off the aluminum oxide. 240 gm of 2,2'-azobis(2,4-dimethylvaleronitrile) sold as Vazo 52 by the Dupont Company and 240 gm of 2,2'-azobis(2methylpentanenitrile) sold as Perkadox AMBN by AKZO Chemical are then dissolved in this uninhibited monomer mixture. In a separate vessel is added 57 kg of demineralized water to which is added 81 gm of poly(2-methylaminoethanol adipate), and 72 gm of Nalcoag 2329, a 40% colloidal suspension of silica sold by Nalco Chemical Company. The uninhibited monomers are added to the aqueous phase and stirred to form a crude emulsion. This is passed twice through a Crepaco homogenizer operated at 5,000 psi. To this is added a solution of 600 gm of polyvinyl alcohol sold by Air Products Company under the trade designation Vinol 523 dissolved in 12.9 kg of demineralized water. The mixture is heated to 45° C. for 16 hours followed by heating to 85° C. for 4 hours. The resulting solid particles are sieved between 18 and 52 mesh. 9 kg of this damp cake is then purified by reslurrying in 9 gal of acetone at 56° C. The acetone washing is repeated for a total of three reslurries. The acetone damp cake is then added to a mixture of 34.8 kg demineralized water, 11.4 kg methanol and 2.8 kg of 50% NaOH and held at room temperature overnight to remove the silica. The beads are washed with demineralized water to a neutral pH and dried under vacuum for 3 days at 50° C.

Example 1

Three separate 6.0 kg of a magenta solid particle filter dye dispersions were prepared in a Netzsch LME-4 media mill with the following formulation:

| dye | 8% |
|---|---|
| surfactant | 0.96% |
| water | 91.04% |

The dye used has the following structural formula:

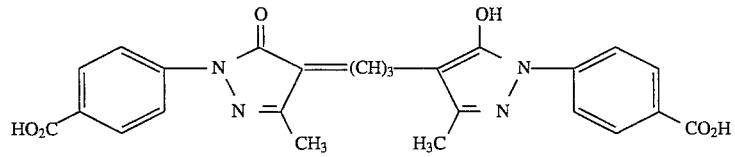

A conventional approach was used for all variations which included the following steps:

1. mixing all ingredients to form a premix slurry 2. adding the milling media to the mill milling chamber 3. pumping the premix through the mill milling chamber in a recirculation mode while the mill milling impellers are agitated at the desired rpm 4. discharging the dispersion from the mill after milling is complete In samples 1 and 2, zirconium silicate media was used and in batch 3 polystyrene media was used.

| Sample | Media Load | RPM | Media Type |
|---|---|---|---|
| 1 | 90% | 2300 | zirconium silicate (0.6–0.8 mm) |
| 2 | 80% | 2100 | zirconium silicate (0.6–0.8 mm) |
| 3 | 80% | 2100 | SDy20 polystyrene (0.4–5 mm) |

Aliquots were extracted at various residence times during milling and a variety of analytical measurements were made. These are tabulated in Table I.

TABLE I

| Sample | residence time (min) | Disc Centrifuge (% < 0.1 mm) | CASS (L/mol-cm) | pH | Zr (ppm) | Fe (ppm) | Si (ppm) |
|---|---|---|---|---|---|---|---|
| 1a | 31 | 36.8 | 41135 | 3.96 | 780 | 42 | 270 |
| 1b | 75 | 50 | 43208 | 4.28 | 2000 | 88 | 640 |
| 1c | 180 | 54.4 | 43891 | 4.41 | 4200 | 190 | 1400 |
| 2a | 44 | 38.7 | 42169 | 4.1 | 420 | 23 | 150 |
| 2b | 111 | 51.1 | 44832 | 4.35 | 1200 | 62 | 350 |
| 2c | 189 | 56 | 45802 | 4.51 | 1700 | 110 | 540 |
| 3a | 31.2 | 36.1 | 41251 | 3.55 | 1.5 | 0.87 | <10 |
| 3b | 74.9 | 49.8 | 42918 | 3.72 | 1.6 | 1.5 | <10 |
| 3c | 184.1 | 53.6 | 43723 | 3.84 | 1.9 | 5 | <10 |

The dispersion particle size was measured by Disc Centrifuge, and the results are reported as the percentage of particles below 0.1 μm. CASS Emax corresponds to the coefficient of molar extinction of the dye (i.e. the covering power). Contamination from zirconium, iron and silicon from the milling media and stainless steel mill components were measured inductively Coupled Plasma Spectroscopy (ICP).

Results

Figure 2:
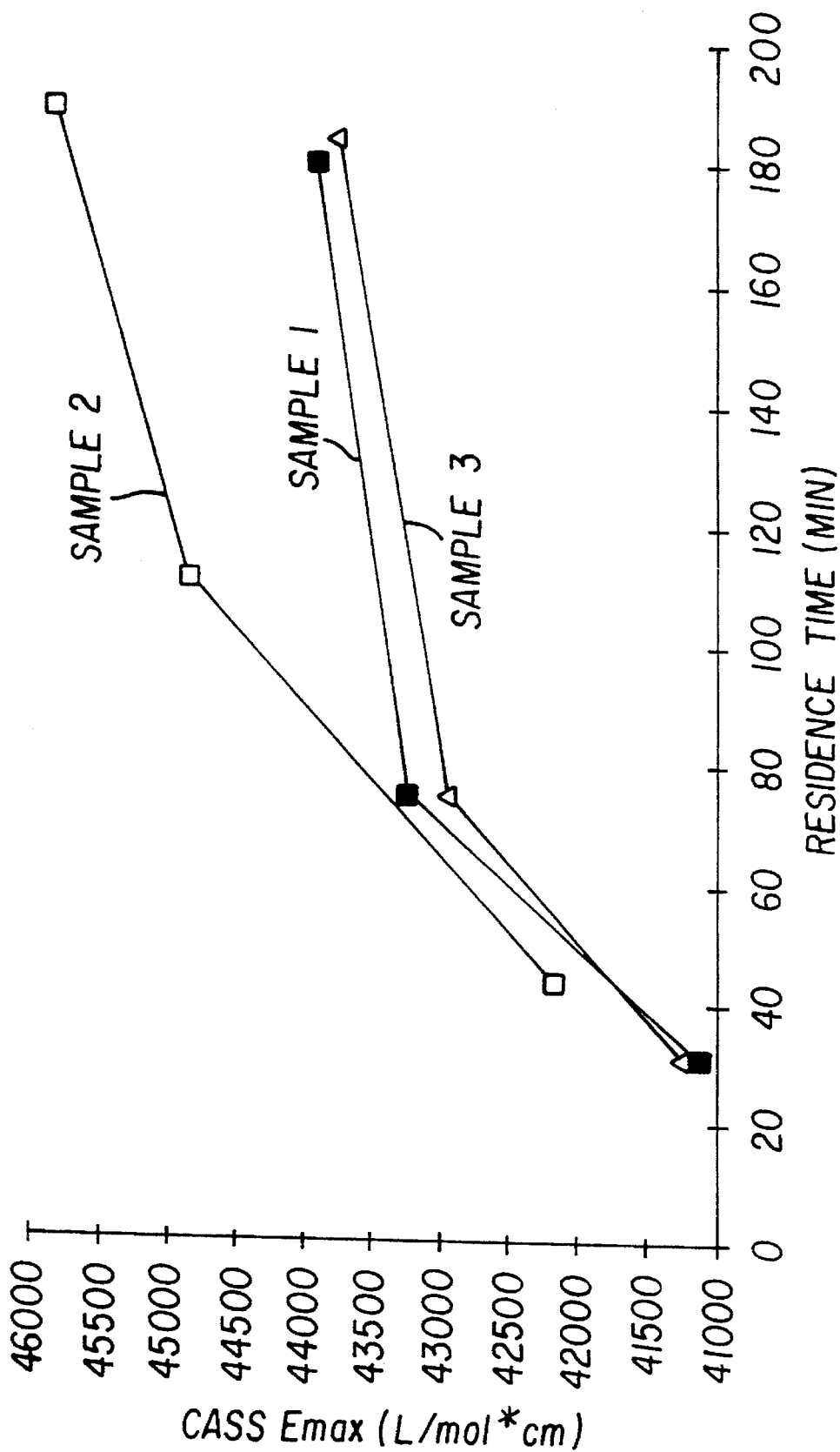
Figure 3:
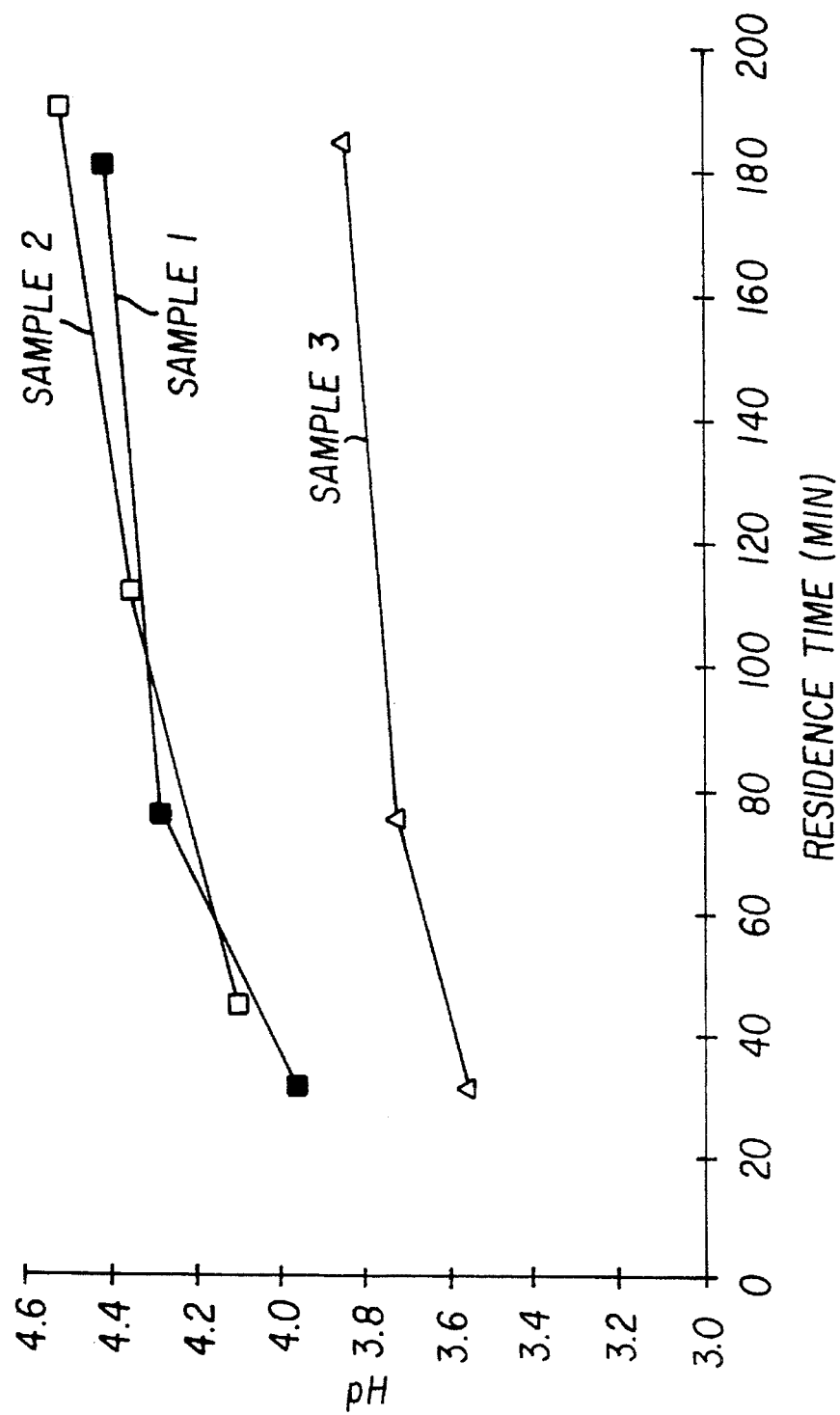
Figure 4:
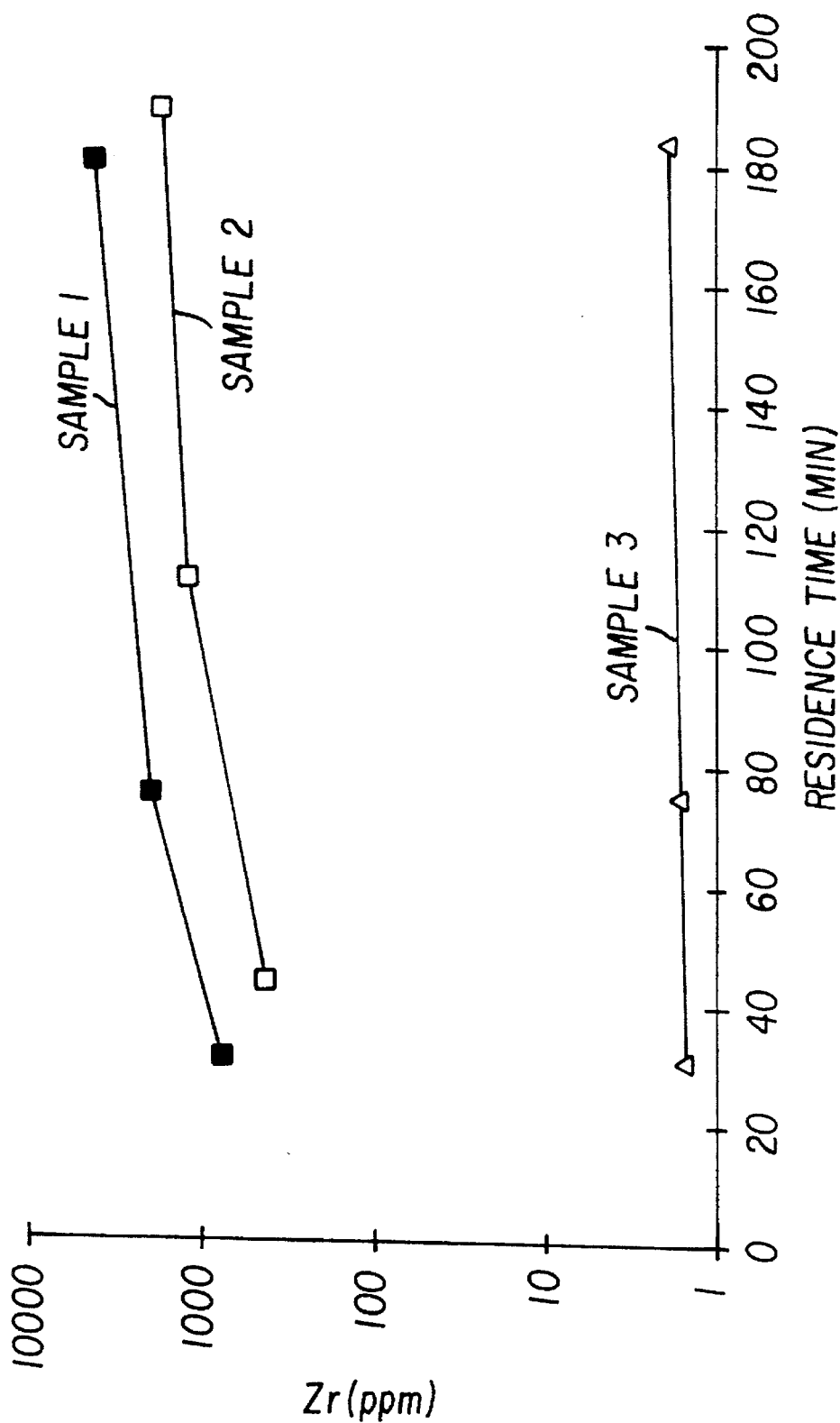
Figure 5:
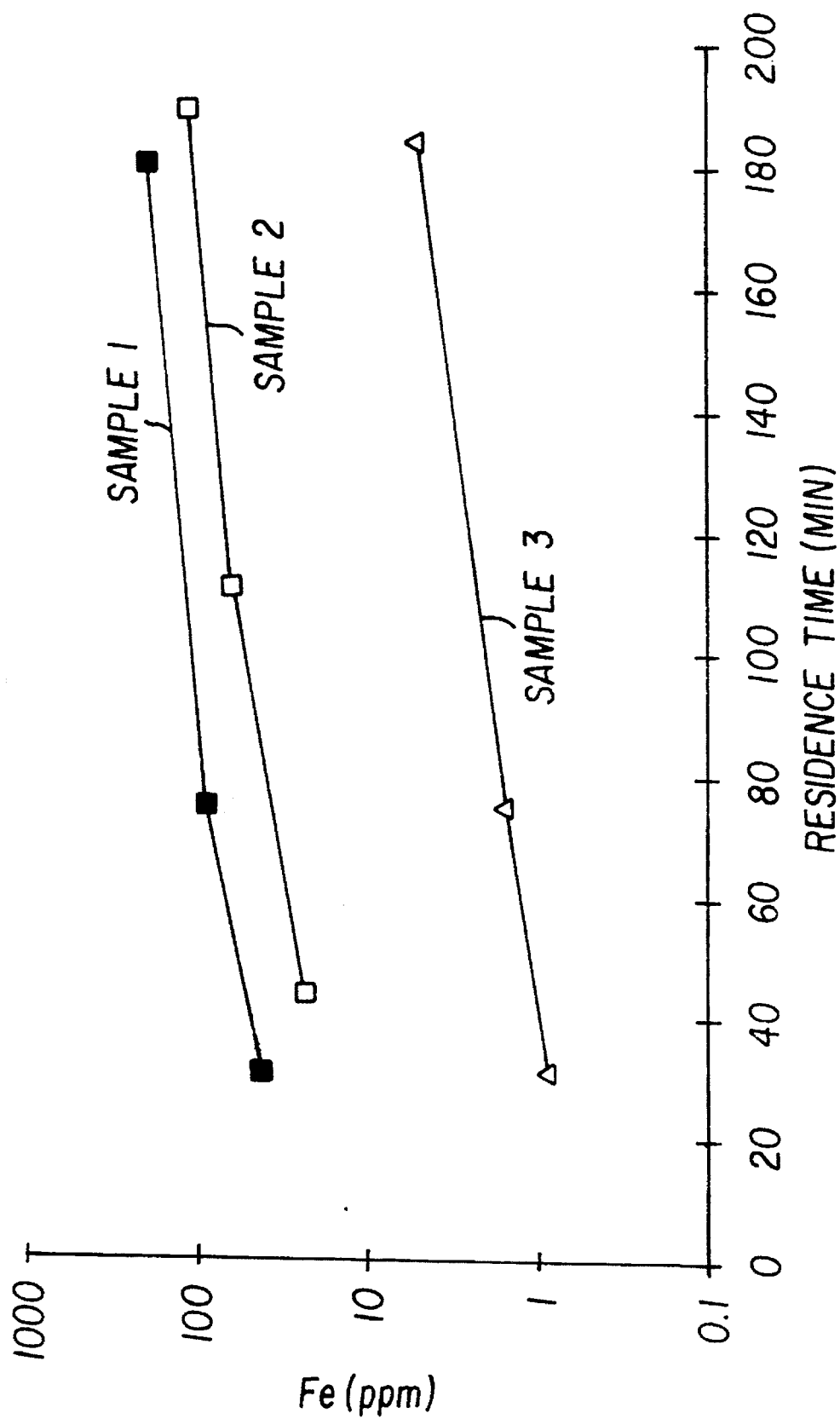

FIG. 1 shows particle size reduction as a function of residence time, which is an indicator of milling efficiency. As shown, under similar milling conditions of RPM and % Media Load, the size reduction efficiency is comparable between zirconium silicate (sample 2) and polystyrene (sample 3) media. Likewise, FIG. 2 shows that covering power is comparable. FIG. 3 shows lower pH and a reduced level of increase in pH during milling for polystyrene media. This is considered advantageous since dispersion stability may be compromised as pH changes. FIGS. 4 and 5 show contamination levels for zirconium and iron. Polystyrene media results in significantly less heavy metal contamination.

Example 2

In a similar experiment, an orange filter dye dispersion was prepared in a 0.3 Liter Dyno-Mill at 40% dye, 4% surfactant, and 66% water. Again, three dispersions were prepared by conventional means with the following variations:

| Sample | % Media Load | RPM | Media |
|---|---|---|---|
| 4 | 90% | 3200 | zirconium silicate |
| 5 | 90% | 3200 | zirconium silicate |
| 6 | 90% | 3200 | polystyrene |

The dye used has the following structural formula:

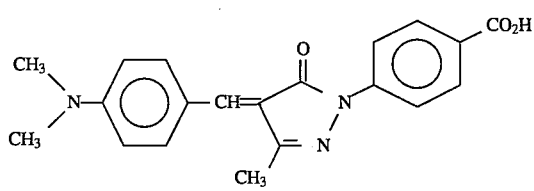

Results

Figure 6:
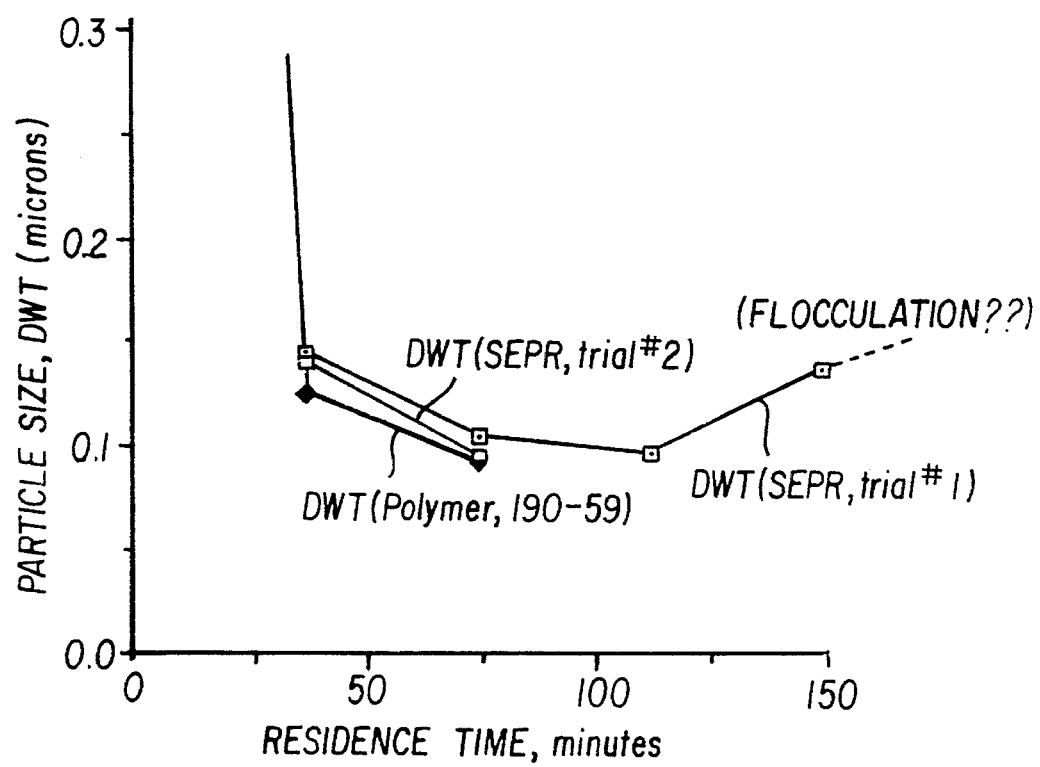
FIGS. 6–10 present the results obtained in Example 2 (below) in graph form.
Figure 7:
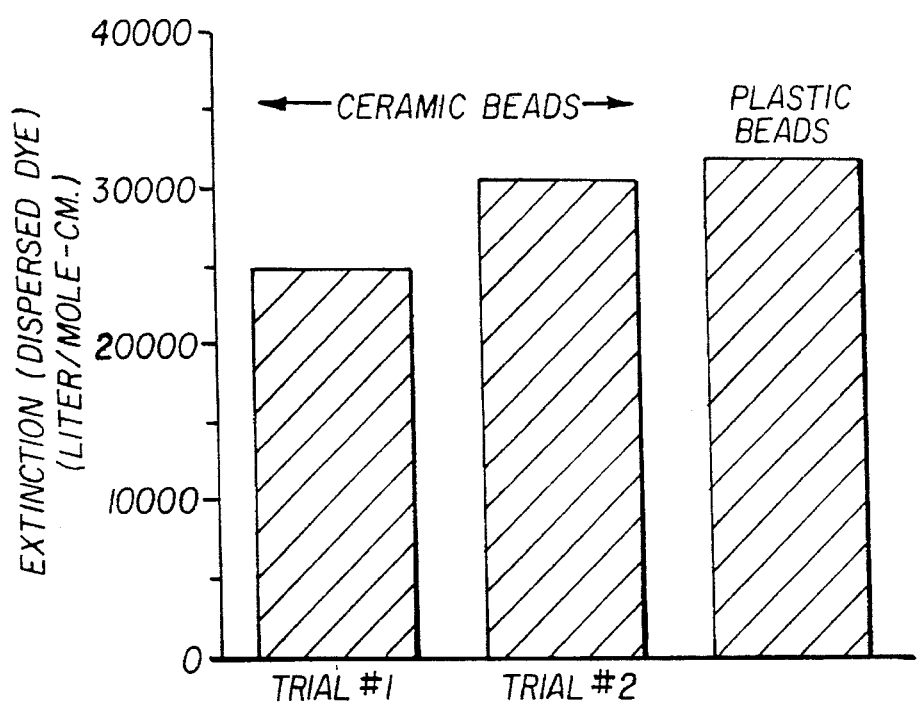
Figure 8:
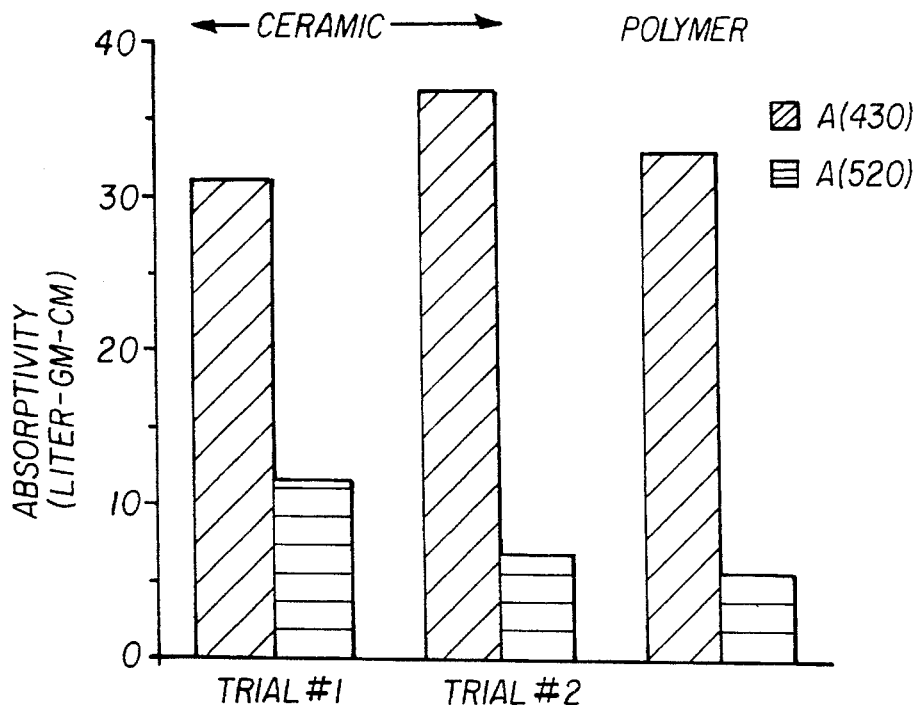
Figure 9:
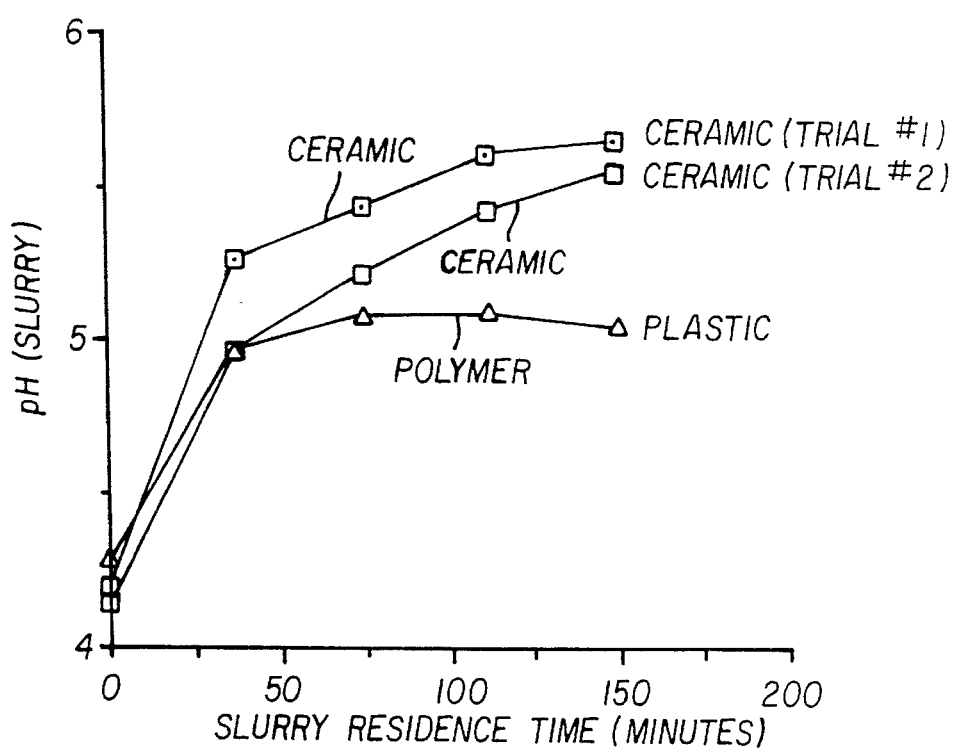
Figure 10:
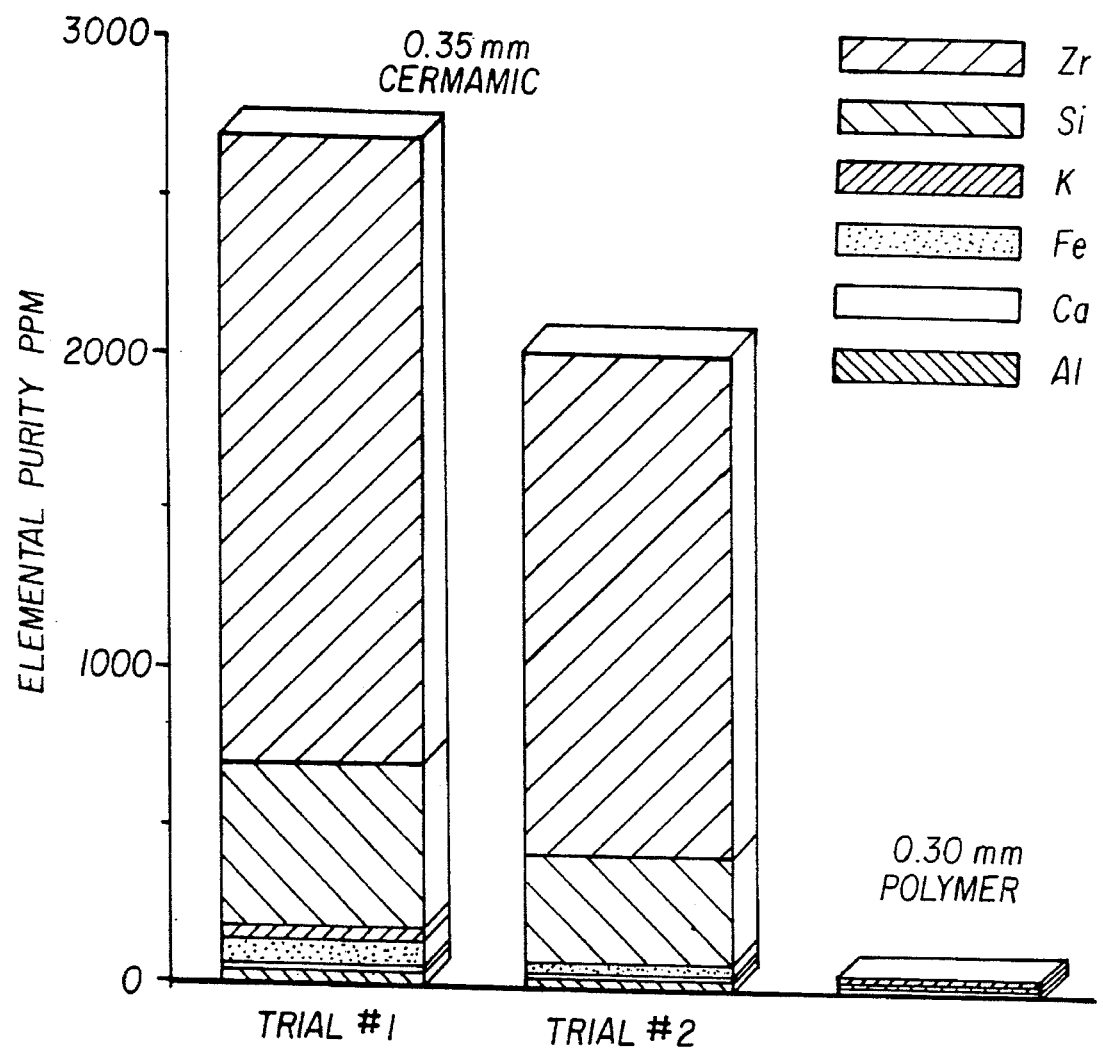

FIG. 6 shows particle size vs. residence time measured by Discrete Wavelength Turbidimetry (DWT), confirming that the polystyrene performs comparably to zirconium silicate. FIGS. 7 and 8 show that spectral covering and off peak absorbance for these variations are comparable. FIG. 9 shows that pH increase is reduced with polymeric media. FIG. 10 shows that metals contamination is greatly reduced.

The invention has been described in detail with particular reference to preferred embodiments thereof, but it is to be understood that variations and modifications can be effected within the spirit and scope of the invention.

What is claimed is:

1. A process for the preparation of solid particles of a compound useful in photographic, electrophotographic, or thermal transfer imaging elements having an average particle size of less than 1 micron selected from the group consisting of dye-forming couplers, development inhibitor release couplers (DIR's), development inhibitor anchimeric release couplers (DI(A)R's), masking couplers, filter dyes, thermal transfer dyes, optical brighteners, nucleators, development accelerators, oxidized developer scavengers, ultraviolet radiation absorbing compounds, sensitizing dyes, development inhibitors, antifoggants, bleach accelerators, magnetic particles, lubricants, and matting agents, which comprises milling said compound in the presence of milling media comprising a polymeric resin.

2. A process according to claim 1, wherein milling media consists essentially of a polymeric resin.

3. A process according to claim 1, wherein the milling media consists essentially of a core having adhered thereon a coating of said polymeric resin.

4. A process according to claim 1, wherein the polymeric resin is selected from the group consisting of cross linked polystyrenes, styrene copolymers, polycarbonates, polyacetals, vinyl chloride polymers and copolymers, polyurethanes, polyamides, fluoropolymers, high density polyethylenes, polypropylenes, cellulose ethers and esters, polyacrylates and silicone containing polymers.

5. A process according to claim 4, wherein the polymeric resin is polystyrene cross linked with divinyl benzene.

6. A process according to claim 4, wherein the polymeric resin is a polycarbonate.

7. A process of claim 1, wherein said milling media has an average size of 0.1–3 mm.

8. A process according to claim 1, wherein the compound useful in imaging elements is milled in a liquid medium.

9. A process according to claim 1, wherein the milling takes place in a mill selected from the group consisting of an airjet mill, a roller mill, a ball mill, a media mill an attritor mill a vibratory mill, a planetary mill, a sand mill, and a bead mill.

10. A process according to claim 9, wherein the mill is a high energy media mill.

11. A process according to claim 1, wherein the compound is a filter dye, a thermal transfer dye, or a sensitizing dye.

12. A process according to claim 11, wherein the compound useful in imaging elements is a filter dye.

13. A process according to claim 1, wherein the particles have an average particle size of less than about 500 nanometers.

* * * * *